United States Patent
Sano et al.

(10) Patent No.: US 10,543,455 B2
(45) Date of Patent: Jan. 28, 2020

(54) GAS SEPARATION MEMBRANE, GAS SEPARATION MODULE, GAS SEPARATION APPARATUS, GAS SEPARATION METHOD, AND METHOD FOR PRODUCING ASYMMETRIC GAS SEPARATION MEMBRANE

(71) Applicant: FUJIFILM Corporation, Tokyo (JP)

(72) Inventors: Satoshi Sano, Kanagawa (JP); Koji Hironaka, Kanagawa (JP); Keisuke Kodama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 213 days.

(21) Appl. No.: 15/669,968

(22) Filed: Aug. 7, 2017

(65) Prior Publication Data

US 2017/0333835 A1 Nov. 23, 2017

Related U.S. Application Data

(63) Continuation of application No. PCT/JP2016/050472, filed on Jan. 8, 2016.

(30) Foreign Application Priority Data

Feb. 27, 2015 (JP) .................... 2015-039091

(51) Int. Cl.
*B01D 53/22* (2006.01)
*B01D 69/12* (2006.01)
(Continued)

(52) U.S. Cl.
CPC ....... *B01D 53/228* (2013.01); *B01D 67/0004* (2013.01); *B01D 69/02* (2013.01);
(Continued)

(58) Field of Classification Search
CPC .. B01D 53/22; B01D 53/228; B01D 67/0009; B01D 71/10; B01D 71/12; B01D 71/16;
(Continued)

(56) References Cited

U.S. PATENT DOCUMENTS 3,864,289 A * 2/1975 Rendall ................. B01D 71/16
525/54.23
4,678,555 A * 7/1987 Wernick ................. B01D 71/16
208/308
(Continued)

FOREIGN PATENT DOCUMENTS

JP S59-55313 3/1984
JP H01-123607 5/1989
(Continued)

OTHER PUBLICATIONS

English language machine translation for JP 2013-188742. Retried from https://worldwide.espacenet.com on May 3, 2019. (Year: 2019).*
(Continued)

*Primary Examiner* — Jason M Greene
(74) *Attorney, Agent, or Firm* — JCIPRNET

(57) ABSTRACT

A gas separation membrane has a gas separation layer containing a crosslinked cellulose resin. The crosslinked cellulose resin has a particular linking structure in a crosslinked structure. The gas separation layer contains an organic solvent in a particular amount.

17 Claims, 1 Drawing Sheet

(51) Int. Cl.
| | |
|---|---|
| *B01D 71/10* | (2006.01) |
| *B01D 67/00* | (2006.01) |
| *C10L 3/10* | (2006.01) |
| *C08B 15/00* | (2006.01) |
| *B01D 69/02* | (2006.01) |
| *B01D 71/16* | (2006.01) |
| *C08B 3/22* | (2006.01) |
| *B01D 69/10* | (2006.01) |
| *B01D 71/70* | (2006.01) |

(52) U.S. Cl.
CPC .......... *B01D 69/12* (2013.01); *B01D 69/125* (2013.01); *B01D 71/10* (2013.01); *B01D 71/16* (2013.01); *C08B 3/22* (2013.01); *C08B 15/005* (2013.01); *C10L 3/104* (2013.01); *B01D 69/10* (2013.01); *B01D 71/70* (2013.01); *B01D 2256/245* (2013.01); *B01D 2257/504* (2013.01); *B01D 2323/30* (2013.01); *B01D 2325/022* (2013.01); *B01D 2325/04* (2013.01); *C10L 2290/548* (2013.01); *Y02C 10/10* (2013.01); *Y02P 20/152* (2015.11)

(58) Field of Classification Search
CPC .......... B01D 2257/504; B01D 2323/30; C10L 3/104; C08B 15/005
See application file for complete search history.

(56) References Cited

U.S. PATENT DOCUMENTS

| | | | |
|---|---|---|---|
| 4,772,392 A | | 9/1988 | Sanders, Jr. et al. |
| 4,932,986 A | * | 6/1990 | Kulkarni ............ B01D 67/0093 536/80 |
| 5,428,123 A | * | 6/1995 | Ward ...................... A61L 27/18 210/500.21 |
| 8,816,003 B2 | | 8/2014 | Liu et al. |
| 9,314,736 B2 | | 4/2016 | Itou |
| 9,687,777 B2 | | 6/2017 | Kodama et al. |
| 2005/0145107 A1 | * | 7/2005 | Kessler ................ B01D 53/228 95/45 |
| 2010/0270234 A1 | | 10/2010 | Liu et al. |
| 2013/0255490 A1 | * | 10/2013 | Matteucci ............ B01D 53/228 95/51 |
| 2014/0137740 A1 | * | 5/2014 | Aburaya ................ B01D 53/22 96/13 |
| 2014/0238626 A1 | * | 8/2014 | Tsuji ....................... C08B 15/02 162/72 |
| 2014/0345462 A1 | * | 11/2014 | Itou ........................ B01D 69/12 96/13 |
| 2015/0075406 A1 | * | 3/2015 | Nemoto ................ B01D 39/18 106/164.01 |
| 2015/0171395 A1 | | 6/2015 | Ikuma et al. |
| 2017/0210101 A1 | * | 7/2017 | Peinemann ........ B01D 67/0079 |

FOREIGN PATENT DOCUMENTS

| | | | |
|---|---|---|---|
| JP | H02-501988 | | 7/1990 |
| JP | H04-505123 | | 9/1992 |
| JP | 2007-297605 | | 11/2007 |
| JP | 2012-075995 | | 4/2012 |
| JP | 2013-166131 | | 8/2013 |
| JP | 2013-188742 | * 9/2013 | ............ B01D 53/22 |
| JP | 2014-113550 | | 6/2014 |
| JP | 2014-176795 | | 9/2014 |
| WO | 2014017335 | | 1/2014 |

OTHER PUBLICATIONS

"International Search Report (Form PCT/ISA/210) of PCT/JP2016/050472," dated Apr. 12, 2016, with English translation thereof, pp. 1-4.

"International Preliminary Report on Patentability of PCT/JP2016/050472; this report contains the following items: PCT/ISA237 (cover sheet), PCT/ISA237 (Box No. I), PCT/ISA237 (Box No. V), Form PCT/IB/373," dated Apr. 12, 2016, which is English translation of "Written Opinion of the International Searching Authority," pp. 1-13.

"Office Action of Japan Counterpart Application" with English translation thereof, dated Jan. 9, 2018, p. 1-p. 11.

\* cited by examiner

US 10,543,455 B2

GAS SEPARATION MEMBRANE, GAS SEPARATION MODULE, GAS SEPARATION APPARATUS, GAS SEPARATION METHOD, AND METHOD FOR PRODUCING ASYMMETRIC GAS SEPARATION MEMBRANE

CROSS-REFERENCE TO RELATED APPLICATIONS

This application is a Continuation of PCT International Application No. PCT/JP2016/50472, filed on Jan. 8, 2016, which claims priority under 35 U.S.C. § 119(a) to Japanese Patent Application No. 2015-039091, filed on Feb. 27, 2015. Each of the above application(s) is hereby expressly incorporated by reference, in its entirety, into the present application.

BACKGROUND OF THE INVENTION

1. Field of the Invention

The present invention relates to a gas separation membrane, a gas separation module, a gas separation apparatus, a gas separation method, and a method for producing an asymmetric gas separation membrane.

2. Description of the Related Art

Materials formed of polymer compounds each have gas permeability specific to the constituent materials. On the basis of this property, it is possible to cause selective permeation and separation of a desired gas component by using a membrane formed of a particular polymer compound. Regarding industrial applications of such a gas separation membrane, in relation to the issues of global warming, separation and recovery of carbon dioxide from large-scale sources of carbon dioxide emission have been examined in thermal power plants, cement plants, blast furnaces in steel mills, and the like. Furthermore, this membrane separation technique has been attracting attention as means capable of solving environmental problems with relatively low energy.

In addition, natural gas and biogas (gas generated by fermentation or anaerobic digestion of excrement of organisms, organic fertilizers, biodegradable substances, sewage, garbage, and energy crops) are mixed gas containing mainly methane and carbon dioxide, and a membrane separation method has been examined as means for removing carbon dioxide and the like which are impurities (JP 2007-297605A).

In purification of natural gas using the membrane separation method, good gas permeability and gas separation selectivity are desired in order to separate gas more efficiently.

In actual plants, membranes are plasticized by, for example, the influence of high-pressure conditions and impurities (for example, benzene, toluene, and xylene) that are present in natural gas, resulting in a problem of a decrease in separation selectivity. It is known that introducing a crosslinked structure or a branched structure to a polymer compound that forms a membrane is effective for suppressing this plasticization of the membrane (for example, the specification of US 2010/0270234 A and the specification of U.S. Pat. No. 8,816,003 B).

In order to realize a practical gas separation membrane, it is necessary to reliably obtain sufficient gas permeability by forming a gas separation layer as a thin layer. An example of the method therefor is a method that includes forming a polymer compound into an asymmetric membrane by a phase separation process, so that a portion that contributes to separation is formed as a thin layer referred to as a dense layer or a skin layer. In this asymmetric membrane, the dense layer is allowed to function as a gas separation layer, and a portion other than the dense layer is allowed to function as a support layer which provides the membrane with mechanical strength.

Besides the asymmetric membrane, a form of a composite membrane is also known in which a material which provides a gas separation function and a material which provides mechanical strength are different from each other. This composite membrane has a structure in which a gas separation layer that is a thin layer formed of a polymer compound is formed on a gas-permeable support which provides mechanical strength.

SUMMARY OF THE INVENTION

However, when the thickness of a gas separation layer is reduced, defects tend to be generated by rubbing, folding, or the like. The generation of membrane defects may cause a significant decrease in the gas separation performance.

The introduction of the crosslinked structure to a polymer compound that forms a gas separation layer is effective for suppressing plasticization of the gas separation layer caused by toluene and the like, which are impurity components in natural gas. However, in gas separation, for example, under conditions of a high temperature, a high pressure, and a high humidity, as in gas separation in a natural gas field, even when the crosslinked structure is introduced, it is difficult to prevent plasticization of a membrane. Thus, there has been a desire for a technique for realizing both gas permeability and gas separation selectivity at a higher level.

In addition, a certain amount of an organic solvent and the like used in the formation of a gas separation layer usually remains in the gas separation layer. When the amount of this residual organic solvent is large, the organic solvent acts as a plasticizer, which may decrease the gas separation performance.

In plants where gas separation is performed, in order to make the amount of daily gas production during normal operation constant, a gas separation membrane is required to have stable gas separation performance (constant gas permeability and gas separation selectivity) from the early stage of the first use. That is, it is desirable to reduce the time from the first use to the stabilization of the gas separation performance. Under these circumstances, in various studies conducted by the inventors of the present invention, the inventors also focused on the fact that the time until the gas separation performance stabilizes can be reduced by incorporating a particular amount of an organic solvent in a gas separation layer without decreasing the gas separation performance.

An object of the present invention is to provide a gas separation membrane having good gas separation selectivity in addition to good gas permeability, being unlikely to be plasticized and exhibiting a good gas separation performance, even when used under conditions of a high temperature, a high pressure, and a high humidity, being unlikely to be affected by toluene and the like, which are impurity components present in natural gas, having good folding endurance and being capable of being processed into various module forms, being capable of being produced at a high yield, and exhibiting a stable gas separation performance from the early stage of the first use. Another object of the present invention is to provide a gas separation module, a gas separation apparatus, and a gas separation method using the gas separation membrane. Still another object of the present invention is to provide a method for producing the gas separation membrane as an asymmetric membrane at a high yield.

In view of the above problems, the inventors of the present invention conducted extensive research. As a result, the inventors found that a gas separation membrane that has a gas separation layer formed by using a crosslinked cellulose resin having a particular linking structure in the crosslinked structure thereof exhibits good gas permeability and gas separation selectivity even under conditions of a high temperature, a high pressure, and a high humidity, exhibits good resistance to toluene and the like, which are impurity components, has sufficiently good folding endurance such that membrane defects are unlikely to be generated even when the membrane is folded repeatedly, and has a good production efficiency with a high yield. Furthermore, the inventors found that a stable gas separation performance is obtained from the early stage of the first use of the gas separation membrane by incorporating a particular amount of an organic solvent in the gas separation layer. Further research that was conducted on the basis of these findings led to the completion of the present invention.

Specifically, the above objects of the present invention have been achieved by means described below.

A first aspect of the present invention provides a gas separation membrane having a gas separation layer containing a crosslinked cellulose resin. The crosslinked cellulose resin has, in a crosslinked structure, at least one linking structure selected from the group consisting of *—O-M-O—*, *—S-M-S—*, *—NR$^a$C(=O)—*, *—NR$^b$C(=O)NR$^b$—*, *—O—CH$_2$—O—*, *—S—(CH$_2$)$_2$—S—*, *—OC(=O)O—*, *—SO$_3^-$N$^+$(R$^c$)$_3$—*, and *—P(=O)(OH)O$^-$N$^+$(R$^d$)$_3$—*. The gas separation layer contains 10 to 5,000 ppm of an organic solvent. In the formulae, M represents a divalent to tetravalent metal atom; R$^a$, R$^b$, R$^c$, and R$^d$ each independently represent a hydrogen atom or an alkyl group; and the symbol * represents a linking site.

The crosslinked cellulose resin is preferably a resin obtained by crosslinking a cellulose resin having a repeating unit represented by General formula (A):

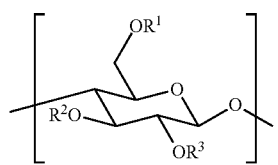

(A)

where R$^1$, R$^2$, and R$^3$ each independently represent a group selected from the group consisting of a hydrogen atom, an alkyl group, and an acyl group.

The linking structure represented by *—O-M-O—* and the linking structure represented by *—S-M-S—* are preferably linking structures formed by coordination of a cellulose resin to a metal atom selected from the group consisting of Zn, B, Al, and Ga through an oxygen atom and a sulfur atom, respectively.

The crosslinked cellulose resin preferably contains 40.0% to 99.8% by mass of an insoluble component.

The gas separation layer preferably contains cellulose nanofibers.

The cellulose nanofibers preferably have a maximum fiber diameter of 30 to 90 nm and a ratio of an average fiber length to an average fiber diameter (average fiber length/average fiber diameter) of 2,000 to 10,000.

The gas separation membrane is preferably an asymmetric membrane.

The gas separation membrane preferably has a thickness of 10 to 200 µm.

The gas separation membrane is preferably the asymmetric membrane supported by a nonwoven fabric.

The gas separation membrane preferably further has a functional polymer layer disposed in contact with the gas separation layer, in which the functional polymer layer has a group selected from the group consisting of an amino group, a thiol group, a hydrosilyl group, a vinyl group, an acryloyl group, a methacryloyl group, an acid anhydride group, a hydroxy group, and an alkoxy group.

The functional polymer layer preferably has a polydimethylsiloxane structure.

The gas separation membrane is preferably used for selectively allowing permeation of carbon dioxide from gas containing carbon dioxide and methane.

A second aspect of the present invention provides a gas separation module including the gas separation membrane according to the first aspect.

A third aspect of the present invention provides a gas separation apparatus including the gas separation module according to the second aspect.

A fourth aspect of the present invention provides a gas separation method including using the gas separation membrane according to the first aspect.

The gas separation method according to the fourth aspect preferably includes selectively allowing permeation of carbon dioxide from gas containing carbon dioxide and methane.

A fifth aspect of the present invention provides a method for producing an asymmetric gas separation membrane, the method including a step of applying, onto a support, a coating solution containing a metal complex and a cellulose resin having an active hydrogen-containing group; a step of drying a surface of the coating solution on the support; and a step of bringing the coating solution on the support into contact with a coagulating liquid to form an asymmetric structure by phase inversion. In the method, the metal complex is represented by Formula (B):

 (B)

In the formula, M represents a divalent to tetravalent metal atom; L represents an alkoxy group, an aryloxy group, an acetylacetonato group, an acyloxy group, a hydroxy group, or a halogen atom; and q represents an integer of 2 to 4.

Herein, when a plurality of substituents, linking groups, or the like (hereinafter referred to as substituents or the like) represented by specific symbols are present or a plurality of substituents or the like are defined simultaneously or alternatively, the substituents or the like may be the same or different from each other. The same applies to the definition of the number of substituents or the like. When a formula includes a plurality of repeated partial structures represented by the same expression, the partial structures or the repeating units may be the same or different from each other. In addition, even if not specifically stated, when a plurality of substituents or the like are close (in particular, adjacent) to each other, they may be linked or fused to each other to form a ring.

With regard to expressing compounds used herein, the expression includes salts thereof and ions thereof in addition to the compounds. Furthermore, the expression includes derivatives formed by changing a part of the structure within the range in which desired effects are achieved.

Herein, a substituent (the same applies to a linking group) in which substitution or no substitution is not specified may have any substituent within the range in which desired effects are achieved. The same applies to a compound in which substitution or no substitution is not specified.

The preferable range of substituents used herein includes groups selected from Group Z of substituents described below, unless otherwise stated.

The gas separation membrane, the gas separation module, and the gas separation apparatus of the present invention exhibit good gas separation selectivity in addition to good gas permeability, exhibit a good gas separation performance, even when used under conditions of a high temperature, a high pressure, and a high humidity, and are less likely to be affected by impurity components, such as toluene and the like, which are present in natural gas. The gas separation membrane, the gas separation module, and a gas separation apparatus of the present invention exhibit a stable gas separation performance from the early stage of the first use. In addition, the gas separation membrane of the present invention has a high yield and is good in terms of production efficiency. Furthermore, the gas separation membrane of the present invention has good folding endurance and can be processed into various module forms.

According to the gas separation method of the present invention, gas can be stably separated even under conditions of a high temperature, a high pressure, and a high humidity with good gas permeability and good gas separation selectivity. Furthermore, according to the gas separation method of the present invention, even when impurities such as toluene and the like are present in gas, a good gas separation performance is maintained.

According to the method for producing an asymmetric gas separation membrane of the present invention, an asymmetric membrane suitable for the gas separation membrane of the present invention can be obtained at a high yield.

DESCRIPTION OF THE PREFERRED EMBODIMENTS

Figure 1:
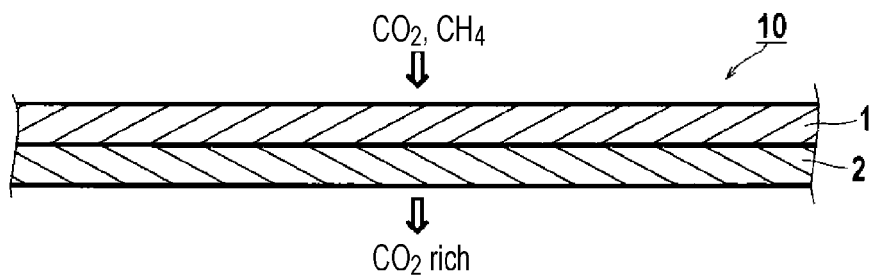
FIG. 1 is a schematic sectional view illustrating a gas separation membrane according to a preferred embodiment (composite membrane) of the present invention.

A gas separation membrane of the present invention contains a crosslinked cellulose resin in a gas separation layer thereof. The crosslinked cellulose resin has a structure in which cellulose resins are linked to each other by crosslinking. A particular linking structure is present in this crosslinked structure. The gas separation membrane of the present invention contains a specific amount of an organic solvent in the gas separation layer.

The gas separation membrane of the present invention may have a form of an asymmetric membrane or a form of a composite membrane.

The gas separation membrane of the present invention will be described in more detail.

Crosslinked Cellulose Resin

The crosslinked cellulose resin used in the present invention has a structure in which cellulose resins are linked to each other by crosslinking. The crosslinked cellulose resin of the present invention preferably has a structure in which cellulose resins are linked to each other through a crosslinking agent.

The crosslinked cellulose resin used in the present invention has, in a crosslinked structure thereof, at least one linking structure selected from the group consisting of *—O-M-O—*, *—S-M-S—*, *—NR$^a$C(=O)—*, *—NR$^b$C(=O)NR$^b$—*, *—O—CH$_2$—O—*, *—S—(CH$_2$)$_2$—S—*, *—OC(=O)O—*, *—SO$_3^-$N$^+$(R$^c$)$_3$—*, and *—P(=O)(OH)O$^-$N$^+$(R$^d$)$_3$—*.

In the linking structures, M represents a divalent to tetravalent metal atom; R$^a$, R$^b$, R$^c$, and R$^d$ each independently represent a hydrogen atom or an alkyl group (This alkyl group is preferably an alkyl group having 1 to 20 carbon atoms, more preferably an alkyl group having 1 to 10 carbon atoms, still more preferably an alkyl group having 1 to 7 carbon atoms, and even still more preferably an alkyl group having 1 to 4 carbon atoms. This alkyl group may be linear or branched, and is more preferably linear. Specific preferred examples of this alkyl group include alkyl groups cited in Group Z of substituents described below); and the symbol represents a linking site. Of the three R$^c$ in *—SO$_3^-$N$^+$(R$^c$)$_3$—*, at least one R$^c$ is preferably a hydrogen atom. Of the three R$^d$ in *—P(=O)(OH)O$^-$N$^+$(R$^d$)$_3$—*, at least one R$^d$ is preferably a hydrogen atom. R$^a$, R$^b$, R$^c$, and R$^d$ are each more preferably a hydrogen atom.

The symbol * represents a linking site and preferably represents a site linking to a residue of a cellulose resin (cellulose residue).

Examples of the metal atom M include metal atoms selected from aluminum (Al), iron (Fe), beryllium (Be), gallium (Ga), vanadium (V), indium (In), titanium (Ti), zirconium (Zr), copper (Cu), cobalt (Co), nickel (Ni), zinc (Zn), calcium (Ca), magnesium (Mg), yttrium (Y), scandium (Sc), chromium (Cr), manganese (Mn), molybdenum (Mo), and boron (B). Of these, a metal atom selected from Zr, Fe, Zn, Al, Ga, and B is preferable, a metal atom selected from Zn and Al is more preferable, and Al is still more preferable.

When the crosslinked cellulose resin has any of the above linking structures in the crosslinked structure thereof, a ratio of an insoluble component described below can be further increased. As a result, while the structure of the gas separation layer has a suitable total sum of the free volume, the average size of the free volume is not excessively large or small, and thus a size suitable for separating carbon dioxide and methane is maintained. Therefore, the gas permeability and the gas separation selectivity can be further improved. Furthermore, it becomes possible to use the membrane under high-pressure, high-temperature, and high-humidity conditions and to further suppress plasticization of the gas separation layer due to impurity components.

Herein, the term "in a crosslinked structure" of a crosslinked cellulose resin refers to "in a linking chain that links cellulose resins to each other".

Reactions for introducing each of the linking structures in a crosslinked structure of a crosslinked cellulose resin will be described below.

*—O-M-O—*

The linking structure *—O-M-O—* can be formed by, for example, a ligand exchange reaction between a cellulose resin that has a group having —OH (active hydrogen-containing group), such as a hydroxy group, a carboxy group, or a sulfo group and a metal complex (crosslinking agent) represented by Formula (B) below.

In the formula, M has the same definition as the above metal atom M, and the preferred form of M is also the same as that of the metal atom M; L represents an alkoxy group, an aryloxy group, an acetylacetonato group, an acyloxy group, a hydroxy group, or a halogen atom; and q represents an integer of 2 to 4.

The alkoxy group for L is preferably an alkoxy group having 1 to 10 carbon atoms, more preferably an alkoxy group having 1 to 4 carbon atoms, and still more preferably an alkoxy group having 1 to 3 carbon atoms. Specific examples of the alkoxy group for L include methoxy, ethoxy, tert-butoxy, and isopropoxy.

The aryloxy group for L is preferably an aryloxy group having 6 to 10 carbon atoms, more preferably an aryloxy group having 6 to 8 carbon atoms, and still more preferably an aryloxy group having 6 to 7 carbon atoms. Specific examples of the aryloxy group for L include phenoxy, 4-methoxyphenoxy, and naphthoxy.

The acyloxy group for L is preferably an acyloxy group having 2 to 10 carbon atoms, more preferably an acyloxy group having 2 to 6 carbon atoms, and still more preferably an acyloxy group having 2 to 4 carbon atoms. Specific examples of the acyloxy group for L include acetoxy, propanoyloxy, pivaloyloxy, and benzoyloxy.

Examples of the halogen atom for L include, but are not particularly limited to, a fluorine atom, a chlorine atom, a bromine atom, and an iodine atom. Of these, a chlorine atom is preferred.

The metal complex represented by Formula (B) is preferably soluble in an organic solvent used in a coating solution for forming the gas separation layer. More specifically, the degree of solubility of the metal complex represented by Formula (B) in 100 g of tetrahydrofuran at 25° C. is preferably 0.01 to 10 g, and more preferably 0.1 to 1.0 g. When the metal complex represented by Formula (B) is soluble in the organic solvent, a more homogeneous metal-crosslinked cellulose resin membrane can be formed.

Specific preferred examples of the metal complex represented by Formula (B) include metal complexes selected from aluminum acetylacetonate, gallium acetylacetonate, indium acetylacetonate, zirconium acetylacetonate, cobalt acetylacetonate, calcium acetylacetonate, nickel acetylacetonate, zinc acetylacetonate, magnesium acetylacetonate, ferric chloride, copper(II) acetate, aluminum isopropoxide, titanium isopropoxide, boric acid, and boron trifluoride-diethyl ether complex.

An example of the ligand exchange reaction is shown below. The example shown below illustrates a case where the cellulose resin has a hydroxy group. In the case where the cellulose resin has another active hydrogen-containing group such as a carboxy group or a sulfo group, a similar ligand exchange reaction proceeds to form the linking structure represented by *—O-M-O—*.

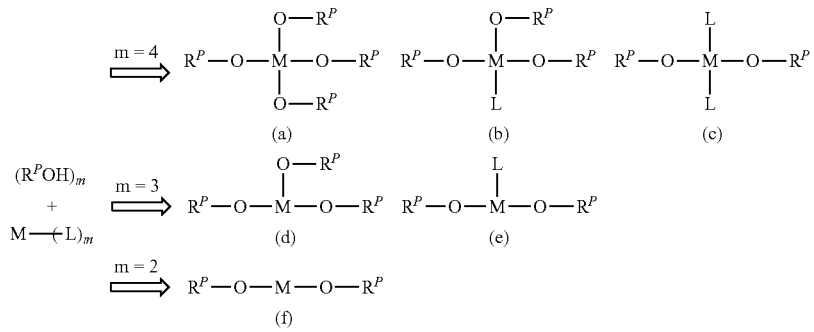

In the formulae, $R^P$ represents a cellulose residue (that is, $R^P$—OH represents a cellulose resin having a hydroxy group).

When M is a tetravalent metal atom (m=4), at most four $R^P$—OH can usually coordinate to one M (the form of (a) above). In the present invention, when M is a tetravalent metal atom, all of the form in which two $R^P$—OH coordinate (the form of (c) above), the form in which three $R^P$—OH coordinate (the form of (b) above), and the form in which four $R^P$—OH coordinate (the form of (a) above) are considered to be included in the form having the linking structure represented by *—O-M-O—*.

Although not shown in the above formulae, when the cellulose resin $R^P$—OH is represented by $R^{P1}$—(OH)$_h$ (where $R^{P1}$ represents a cellulose residue and h represents an integer of 2 or more, that is, in the case of a form having two or more hydroxy groups in one molecule), two or more OH present in one molecule of $R^{P1}$—(OH)$_h$ may coordinate to one M. This form is also considered to be included in the form having the linking structure represented by *—O-M-O—*.

When M is a trivalent metal atom (m=3), at most three $R^P$—OH can usually coordinate to one M (the form of (d) above). In the present invention, when M is a trivalent metal atom, both the form in which two $R^P$—OH coordinate (the form of (e) above) and the form in which three $R^P$—OH coordinate (the form of (d) above) are considered to be included in the form having the linking structure represented by *—O-M-O—*.

Although not shown in the above formulae, when the cellulose resin $R^P$—OH is represented by $R^{P1}$—(OH)$_h$ (where $R^{P1}$ represents a cellulose residue and h represents an integer of 2 or more, that is, in the case of a form having two or more hydroxy groups in one molecule), two or more OH present in one molecule of $R^{P1}$—(OH)$_h$ may coordinate to one M. This form is also considered to be included in the form having the linking structure represented by *—O-M-O—*.

When M is a divalent metal atom (m=2), the form of (f) above is the form having the linking structure represented by *—O-M-O—* and specified in the present invention.

Although not shown in the above formula, when the cellulose resin $R^P$—OH is represented by $R^{P1}$—(OH)$_h$ (where $R^{P1}$ represents a cellulose residue and h represents an integer of 2 or more, that is, in the case of a form having two or more hydroxy groups in one molecule), two or more OH present in one molecule of $R^{P1}$—(OH)$_h$ may coordinate to one M. This form is also considered to be included in the form having the linking structure represented by *—O-M-O—*.

*—S-M-S—*

The linking structure *—S-M-S—* can be formed by, for example, a ligand exchange reaction between a cellulose resin having a thiol group and a metal complex represented by Formula (B) above. This reaction includes a reaction form in which $R^P$—OH in the above-described reaction for forming *—O-M-O—* is replaced by $R^P$—SH. Since —SH is also an active hydrogen-containing group, the ligand exchange reaction can be performed in the same manner as described above.

*—NR$^a$C(=O)—*

The linking structure *—NR$^a$C(=O)—* can be formed by, for example, allowing a cellulose resin having a carboxy group and a diamine compound functioning as a crosslinking agent to react with each other in the presence of a dehydration condensing agent (for example, a carbodiimide compound). This reaction can be represented by the following formula.

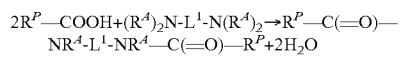

In the formula, $R^P$ represents a cellulose residue, and $L^1$ represents a linking group. Of the two $R^A$ linked to one N on the left side, one $R^A$ is a hydrogen atom and the other $R^A$ is a hydrogen atom or an alkyl group (that is, each $R^A$ on the right side is a hydrogen atom or an alkyl group).

Alternatively, the linking structure represented by *—NR$^a$C(=O)—* can be formed in a crosslinked structure by allowing a cellulose resin having an amino group and a dicarboxylic acid compound functioning as a crosslinking agent to react with each other in the presence of a dehydration condensing agent. Note that a urethane structure *—NHC(=O)—O—* is excluded from the linking structure *—NR$^a$C(=O)—*.

*—NR$^b$C(=O)NR$^b$—*

The linking structure *—NR$^b$C(=O)NR$^b$—* can be formed by, for example, allowing a cellulose resin having an amino group and a chloroformate functioning as a crosslinking agent to react with each other. This reaction can be represented by the following formula.

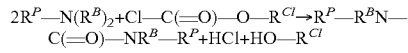

In the formula, $R^P$ represents a cellulose residue, and $R^{Cl}$ represents an alcohol residue of a chloroformate. Of the two $R^B$ linked to one N on the left side, one $R^B$ is a hydrogen atom and the other $R^B$ is a hydrogen atom or an alkyl group (that is, each $R^B$ on the right side is a hydrogen atom or an alkyl group).

*—O—CH$_2$—O—*

The linking structure *—O—CH$_2$—O—* can be formed by, for example, allowing a cellulose resin having a hydroxy group and formaldehyde functioning as a crosslinking agent to react with each other. This reaction can be represented by the following formula.

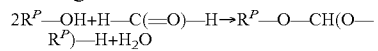

In the formula, $R^P$ represents a cellulose residue.

*—S—(CH$_2$)$_2$—S—*

The linking structure *—S—(CH$_2$)$_2$—S—* can be formed by, for example, allowing a cellulose resin having a thiol group and a divinyl compound functioning as a crosslinking agent to react with each other. This reaction can be represented by the following formula.

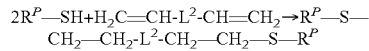

In the formula, $R^P$ represents a cellulose residue, and $L^2$ represents a linking group.

Alternatively, the linking structure represented by *—S—(CH$_2$)$_2$—S—* can be formed in a crosslinked structure by allowing a cellulose resin having a vinyl group and a dithiol compound functioning as a crosslinking agent to react with each other.

*—OC(=O)O—*

The linking structure *—OC(=O)O—* can be formed by, for example, allowing a cellulose resin having a hydroxy group and a chloroformate functioning as a crosslinking agent to react with each other. This reaction can be represented by the following formula.

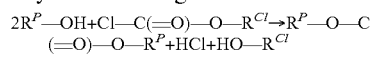

In the formula, $R^P$ represents a cellulose residue, and $R^{Cl}$ represents an alcohol residue of a chloroformate.

*—SO$_3$$^-$N$^+$(R$^c$)$_3$—*

The linking structure *—SO$_3$$^-$N$^+$(R$^c$)$_3$—* can be formed by, for example, allowing a cellulose resin having a sulfo group and a diamine compound functioning as a crosslinking agent to react with each other. This reaction can be represented by the following formula.

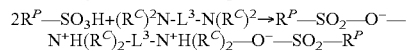

In the formula, $R^P$ represents a cellulose residue, $L^3$ represents a linking group, and $R^C$ represents a hydrogen atom or an alkyl group.

Alternatively, the linking structure represented by *—SO$_3$$^-$N$^+$(R$^c$)$_3$—* can be formed in a crosslinked structure by allowing a cellulose resin having an amino group and a compound having two or more sulfo groups to react with each other.

*—P(=O)(OH)O$^-$N$^+$(R$^d$)$_3$—*

The linking structure *—P(=O)(OH)O$^-$N$^+$(R$^d$)$_3$—* can be formed by, for example, allowing a cellulose resin having a phosphonic acid group and a diamine compound functioning as a crosslinking agent to react with each other. This reaction can be represented by the following formula.

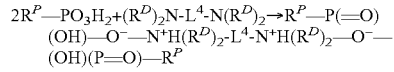

In the formula, $R^P$ represents a cellulose residue, $L^4$ represents a linking group, and $R^D$ represents a hydrogen atom or an alkyl group.

Alternatively, the linking structure represented by *—PO$_3$H$^-$N$^+$(R$^d$)$_3$—* can be formed in a crosslinked structure by allowing a cellulose resin having an amino group and a compound having two or more phosphonic acid groups to react with each other.

In each of the reactions, the amounts of cellulose resin and crosslinking agent used are determined by the stoichiometric ratio. Usually, 0.1 to 30 parts by mass of the crosslinking agent is used relative to 100 parts by mass of the cellulose resin. Preferably, 0.2 to 25 parts by mass of the crosslinking agent is used relative to 100 parts by mass of the cellulose resin. More preferably, 0.3 to 20 parts by mass of the crosslinking agent is used relative to 100 parts by mass of the cellulose resin.

The structure of a cellulose resin before the formation of crosslinking, the cellulose resin being used as a raw material of the crosslinked cellulose resin of the present invention, is not particularly limited and is preferably constituted by a repeating unit represented by Formula (A) below. In this case, in the repeating unit shown below and present at a terminal of the cellulose resin, the structure (substituent) of the terminal is preferably a group selected from a hydroxy group, a carboxy group, an amino group, a vinyl group, a mercapto group, a sulfonic acid group, and a phosphonic acid group.

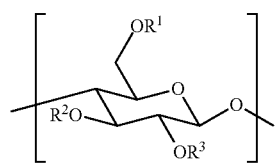

(A)

In the formula, $R^1$, $R^2$, and $R^3$ each independently represent a group selected from a hydrogen atom, an alkyl group (the alkyl group is preferably an alkyl group having 1 to 10 carbon atoms, more preferably an alkyl group having 1 to 5 carbon atoms, and still more preferably an alkyl group having 1 to 3 carbon atoms, and preferred specific examples thereof include alkyl groups cited in Group Z of substituents described below), and an acyl group (the acyl group is preferably an acyl group having 2 to 12 carbon atoms, more preferably an acyl group having 2 to 10 carbon atoms, still more preferably an acyl group having 2 to 8 carbon atoms, and even still more preferably an acyl group having 2 to 5 carbon atoms, and preferred specific examples thereof include acyl groups cited in Group Z of substituents described below).

When $R^1$, $R^2$, and $R^3$ are each an alkyl group or an acyl group, the alkyl group or the acyl group may further have a substituent. The substituent of $R^1$, $R^2$, and $R^3$ when $R^1$, $R^2$, and $R^3$ are each an alkyl group or an acyl group is preferably a functional group that contributes to the crosslinking formation reactions described above. More specifically, the substituent is preferably a group selected from a hydroxy group, an amino group, a vinyl group, a carboxy group, a sulfo group, a phosphonic acid group, and a thiol group, and more preferably a group selected from a hydroxy group, a vinyl group, and a thiol group.

In the crosslinked cellulose resin used in the present invention, the linking structure present in the crosslinked structure is preferably a linking structure selected from *—O-M-O—*, *—S-M-S—*, *—O—CH$_2$—O—*, and *—S—(CH$_2$)$_2$—S—* described above, more preferably a linking structure selected from *—O-M-O—*, *—O—CH$_2$—O—*, and *—S—(CH$_2$)$_2$—S—*, and still more preferably *—O-M-O—* from the viewpoint of high-speed reactivity during the formation of a crosslinking chain and chemical stability of the crosslinking chain. Specifically, the crosslinked cellulose resin used in the present invention particularly preferably has a metal-crosslinked structure in which a cellulose resin coordinates to a central metal M through an oxygen atom as a coordination atom.

Examples of the cellulose resin formed by a repeating unit represented by General formula (A) above include P-1 to P-22 shown below. However, the present invention is not limited thereto. In the examples shown below, d represents the degree of substitution (maximum value: 3) of R, Ph represents phenyl, Ac represents acetyl, Me represents methyl, and HP represents hydroxypropyl.

The number of repeating units in P-1 to P-22 below may be, for example, 10 to 10,000.

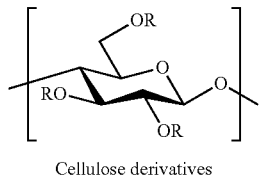

Cellulose derivatives

| | |
|---|---|
| P-1 | R = H, COCH$_3$, d <2.0 |
| P-2 | R = H, COCH$_3$, d = 2.19 |
| P-3 | R = H, COCH$_3$, d = 2.44 |
| P-4 | R = H, COCH$_3$, d = 2.86 |
| P-5 | R = H, COCH$_3$, COCH$_2$CH$_3$ |
| P-6 | R = H, COCH$_3$, COPh |
| P-7 | R = H, COCH$_3$, COPh |
| P-8 | R = H, CH$_2$CH$_3$, d = 2.1 |
| P-9 | R = H, CH$_3$, CH$_2$CH$_2$OH |
| P-10 | R = H, CH$_3$, CH$_2$CH(OH)CH$_3$ |
| P-11 | R = H, CH$_3$, CH$_2$CH$_3$, CH$_2$CH$_2$OH |
| P-12 | R = H, CH$_2$CH$_2$OH |
| P-13 | R = H, CH$_2$CH$_2$OH, CH$_2$CH$_2$OAc |
| P-14 | R = H, CH$_2$CO$_2$H |
| P-15 | R = H, COCH$_3$, COC$_6$H$_4$CO$_2$H |
| P-16 | R = H, CH$_3$, CH$_2$CH(OAc)CH$_3$ d(Me/HP-Ac/Ac = 1.5/0.2/1.3) |
| P-17 | R = H, CH$_3$, COCH$_3$ CH$_2$CH$_2$OCOCH$_3$ |
| P-18 | R = H, CH$_3$, COCH$_3$ |
| P-19 | R = H, CH$_3$, CH$_2$CH$_3$ |
| P-20 | R = H, COCH$_3$, CH$_2$CH$_3$ |
| P-21 | R = H, COCH$_3$, COCH$_2$CH$_2$SH |
| P-22 | R = H, COCH$_3$, CH$_2$CH$_2$CONHCH$_2$CH$_2$CH$_2$N(CH$_3$)$_2$ |

Group Z of Substituents

Group Z of substituents includes alkyl groups (the number of carbon atoms of each of the alkyl groups is preferably 1 to 30, more preferably 1 to 20, and particularly preferably 1 to 10, and examples thereof include methyl, ethyl, isopropyl, tert-butyl, n-octyl, n-decyl, and n-hexadecyl); cycloalkyl groups (the number of carbon atoms of each of the cycloalkyl groups is preferably 3 to 30, more preferably 3 to 20, and particularly preferably 3 to 10, and examples thereof include cyclopropyl, cyclopentyl, and cyclohexyl); alkenyl groups (the number of carbon atoms of each of the alkenyl groups is preferably 2 to 30, more preferably 2 to 20, and particularly preferably 2 to 10, and examples thereof include vinyl, allyl, 2-butenyl, and 3-pentenyl); alkynyl groups (the number of carbon atoms of each of the alkynyl groups is preferably 2 to 30, more preferably 2 to 20, and particularly preferably 2 to 10, and examples thereof include propargyl and 3-pentynyl); aryl groups (the number of carbon atoms of each of the aryl groups is preferably 6 to 30, more preferably 6 to 20, and particularly preferably 6 to 12, and examples thereof include phenyl, p-methylphenyl, naphthyl, and anthranyl); amino groups (examples thereof include an amino group, alkylamino groups, arylamino groups, and heterocyclic amino groups, the number of carbon atoms of each of the amino groups is preferably 0 to 30, more preferably 0 to 20, and particularly preferably 0 to 10, and specific examples thereof include amino, methylamino, dimethylamino, diethylamino, dibenzylamino, diphenylamino, and ditolylamino); alkoxy groups (the number of carbon atoms of each of the alkoxy groups is preferably 1 to 30, more preferably 1 to 20, and particularly preferably 1 to 10, and examples thereof include methoxy, ethoxy, butoxy, and 2-ethylhexyloxy); aryloxy groups (the number of carbon atoms of each of the aryloxy groups is preferably 6 to 30, more preferably 6 to 20, and particularly preferably 6 to 12, and examples thereof include phenyloxy, 1-naphthyloxy, and 2-naphthyloxy); heterocyclic oxy groups (the number of carbon atoms of each of the heterocyclic oxy groups is preferably 1 to 30, more preferably 1 to 20, and particularly preferably 1 to 12, and examples thereof include pyridyloxy, pyrazyloxy, pyrimidyloxy, and quinolyloxy);

acyl groups (the number of carbon atoms of each of the acyl groups is preferably 1 to 30, more preferably 1 to 20, and particularly preferably 1 to 12, and examples thereof include acetyl, benzoyl, formyl, and pivaloyl); alkoxycarbonyl groups (the number of carbon atoms of each of the alkoxycarbonyl groups is preferably 2 to 30, more preferably 2 to 20, and particularly preferably 2 to 12, and examples thereof include methoxycarbonyl and ethoxycarbonyl); aryloxycarbonyl groups (the number of carbon atoms of each of the aryloxycarbonyl groups is preferably 7 to 30, more preferably 7 to 20, and particularly preferably 7 to 12, and examples thereof include phenyloxycarbonyl); acyloxy groups (the number of carbon atoms of each of the acyloxy groups is preferably 2 to 30, more preferably 2 to 20, and particularly preferably 2 to 10, and examples thereof include acetoxy and benzoyloxy); acylamino groups (the number of carbon atoms of each of the acylamino groups is preferably 2 to 30, more preferably 2 to 20, and particularly preferably 2 to 10, and examples thereof include acetylamino and benzoylamino);

alkoxycarbonylamino groups (the number of carbon atoms of each of the alkoxycarbonylamino groups is preferably 2 to 30, more preferably 2 to 20, and particularly preferably 2 to 12, and examples thereof include methoxycarbonylamino); aryloxycarbonylamino groups (the number of carbon atoms of each of the aryloxycarbonylamino groups is preferably 7 to 30, more preferably 7 to 20, and particularly preferably 7 to 12, and examples thereof include phenyloxycarbonylamino); sulfonylamino groups (the number of carbon atoms of each of the sulfonylamino groups is preferably 1 to 30, more preferably 1 to 20, and particularly preferably 1 to 12, and examples thereof include methanesulfonylamino and benzenesulfonylamino); sulfamoyl groups (the number of carbon atoms of each of the sulfamoyl groups is preferably 0 to 30, more preferably 0 to 20, and particularly preferably 0 to 12, and examples thereof include sulfamoyl, methylsulfamoyl, dimethylsulfamoyl, and phenylsulfamoyl);

carbamoyl groups (the number of carbon atoms of each of the carbamoyl groups is preferably 1 to 30, more preferably 1 to 20, and particularly preferably 1 to 12, and examples thereof include carbamoyl, methylcarbamoyl, diethylcarbamoyl, and phenylcarbamoyl); alkylthio groups (the number of carbon atoms of each of the alkylthio groups is preferably 1 to 30, more preferably 1 to 20, and particularly preferably 1 to 12, and examples thereof include methylthio and ethylthio); arylthio groups (the number of carbon atoms of each of the arylthio groups is preferably 6 to 30, more preferably 6 to 20, and particularly preferably 6 to 12, and examples thereof include phenylthio); heterocyclic thio groups (the number of carbon atoms of each of the heterocyclic thio groups is preferably 1 to 30, more preferably 1 to 20, and particularly preferably 1 to 12, and examples thereof include pyridylthio, 2-benzimizolylthio, 2-benzoxazolylthio, and 2-benzothiazolylthio);

sulfonyl groups (the number of carbon atoms of each of the sulfonyl groups is preferably 1 to 30, more preferably 1 to 20, and particularly preferably 1 to 12, and examples thereof include mesyl and tosyl); sulfinyl groups (the number of carbon atoms of each of the sulfinyl groups is preferably 1 to 30, more preferably 1 to 20, and particularly preferably 1 to 12, and examples thereof include methanesulfinyl and benzenesulfinyl); ureido groups (the number of carbon atoms of each of the ureido groups is preferably 1 to 30, more preferably 1 to 20, and particularly preferably 1 to 12, and examples thereof include ureido, methylureido, and phenylureido); phosphoric amide groups (the number of carbon atoms of each of the phosphoric amide groups is preferably 1 to 30, more preferably 1 to 20, and particularly preferably 1 to 12, and examples thereof include diethyl phosphoric amide and phenyl phosphoric amide); a hydroxy group; a mercapto group; halogen atoms (such as a fluorine atom, a chlorine atom, a bromine atom, and an iodine atom, and a fluorine atom is more preferable);

a cyano group; a sulfo group; a carboxyl group; an oxo group; a nitro group; a hydroxamic acid group; a sulfino group; a hydrazino group; an imino group; heterocyclic groups (3- to 7-membered ring heterocyclic groups are preferable, the heterocycle may be aromatic or non-aromatic, examples of the heteroatom contained in the heterocycle include a nitrogen atom, an oxygen atom, and a sulfur atom, the number of carbon atoms of each of the heterocyclic groups is preferably 0 to 30 and more preferably 1 to 12, and specific examples thereof include imidazolyl, pyridyl, quinolyl, furyl, thienyl, piperidyl, morpholino, benzoxazolyl, benzimidazolyl, benzothiazolyl, carbazolyl, and azepinyl); silyl groups (the number of carbon atoms of each of the silyl groups is preferably 3 to 40, more preferably 3 to 30, and particularly preferably 3 to 24, and examples thereof include trimethylsilyl and triphenylsilyl); and silyloxy groups (the number of carbon atoms of each of the silyloxy groups is preferably 3 to 40, more preferably 3 to 30, and particularly preferably 3 to 24, and examples thereof include trimethylsilyloxy and triphenylsilyloxy). These substituents may be further substituted with any one or more substituents selected from Group Z of substituents described above.

In the present invention, when one structural site has a plurality of substituents, these substituents may be linked to each other to form a ring or may be fused with part or the whole of the structural site to form an aromatic ring or an unsaturated heterocyclic ring.

A molecular weight of the cellulose resin before the formation of crosslinking, the cellulose resin being used in the present invention, is preferably 10,000 to 1,000,000, more preferably 15,000 to 500,000, and still more preferably 20,000 to 200,000 in terms of weight-average molecular weight.

The terms "molecular weight" and "dispersity" used herein refer to values determined by gel permeation chromatography (GPC) unless otherwise stated, and the term "molecular weight" refers to a weight-average molecular weight in terms of polystyrene. The measurement conditions are as follows.

Type of column used: TOSOH TSKgel Super AWM-H (6.0 mm ID×15 cm)
Number of columns used: 3
Type of solvent: N-methylpyrrolidone
Flow rate of solvent: 0.5 mL/min.
Measurement temperature: 40° C.
Apparatus: TOSOH EcoSEC HLC-8320GPC In the crosslinked cellulose resin used in the present invention, preferably 40.0% to 99.8% by mass, more preferably 60.0% to 99.8% by mass, still more preferably 70.0% to 99.8% by mass, and even still more preferably 80.0% to 99.8% by mass of the crosslinked cellulose resin is an insoluble component. When the ratio of the insoluble component in the crosslinked cellulose resin is within the above preferred range, plasticization is unlikely to occur even during use under conditions of a high temperature, a high pressure, and a high humidity, and the gas permeability and the separation selectivity can be appropriately balanced.

The insoluble component of the crosslinked cellulose resin is measured by the method described in Examples below.

Gas Separation Layer

In the gas separation membrane of the present invention, the gas separation layer contains the crosslinked cellulose resin described above.

In the gas separation membrane of the present invention, the gas separation layer contains 10 to 5,000 ppm of an organic solvent on a mass basis. When the gas separation layer contains an organic solvent in the above-mentioned range, the gas separation performance can be stabilized from the early stage of the first use of the gas separation membrane (that is, it is possible to reduce the time necessary from the first use to stabilization of the gas permeability and the gas separation selectivity at a predetermined level).

The content of the organic solvent present in the gas separation layer is preferably 10 to 1,000 ppm and more preferably 30 to 500 ppm on a mass basis from the viewpoint of further stabilizing the gas separation performance of the gas separation membrane from the early stage of the first use.

The organic solvent contained in the gas separation layer is not particularly limited and is usually an organic solvent used for preparing a coating solution by dissolving a cellulose resin and a crosslinking agent in the formation of the gas separation layer. The organic solvent is preferably an aprotic organic solvent, and more preferably an aprotic polar organic solvent. Preferred examples of the organic solvent contained in the gas separation layer include organic solvents selected from methyl ethyl ketone, methyl isobutyl ketone, N-methylpyrrolidone, N-ethylpyrrolidone, γ-butyrolactone, dimethyl sulfoxide, dimethylacetamide, dimethylformamide, methylene chloride, tetrahydrofuran, dioxane, and 1,3-dioxolane. Organic solvents selected from methyl ethyl ketone, N-methylpyrrolidone, methylene chloride, tetrahydrofuran, and 1,3-dioxolane are more preferable. These organic solvents have relatively high boiling points and thus can be made present relatively stably in the gas separation layer.

In the gas separation membrane of the present invention, it is also preferable that the gas separation layer contain cellulose nanofibers. When the gas separation layer contains cellulose nanofibers, the gas permeability can be further enhanced without impairing the gas separation selectivity.

A maximum fiber diameter of the cellulose nanofibers is preferably 30 to 90 nm, more preferably 30 to 80 nm, and still more preferably 30 to 50 nm. A ratio of an average fiber length to an average fiber diameter (average fiber length/average fiber diameter) of the cellulose nanofibers is preferably 2,000 to 10,000, more preferably 2,000 to 8,000, and still more preferably 2,000 to 5,000.

The term "maximum fiber diameter" of cellulose nanofibers refers to the maximum of a fiber height (a width in a direction perpendicular to an axial direction of a fiber) of cellulose nanofibers. This maximum fiber diameter is measured as follows. An aqueous dispersion of cellulose nanofibers having a solid concentration of 0.0001% by mass is prepared, and the aqueous dispersion is dripped on mica and dried to prepare an observation sample. The maximum fiber diameter of the observation sample is measured by using an atomic force microscope. More specifically, 50 cellulose nanofibers are sampled at random, and the maximum fiber height of each of the 50 cellulose nanofibers is measured. Among these maximum values, the highest measurement value of the fiber height is defined as the maximum fiber diameter.

The term "average fiber diameter" of cellulose nanofibers refers to the average of the fiber height of cellulose nanofibers. The average fiber diameter is calculated from the fiber diameters measured by using an atomic force microscope image as in the above method. More specifically, 50 cellulose nanofibers are sampled at random, and the maximum fiber height of each of the 50 cellulose nanofibers is measured. The average of the maximum values of the fiber heights is defined as the average fiber diameter.

The average fiber length of cellulose nanofibers is determined as follows. Fifty cellulose nanofibers in which fusion of fibers or the like does not occur are sampled at random, and the length of each of the 50 cellulose nanofibers in the axial direction is measured. The average of the lengths is defined as the average fiber length.

The cellulose nanofibers can be prepared by an ordinary method. The cellulose nanofibers can be prepared, for example, in accordance with the method described in Biomacromolecules, 2006, 7(6), pp. 1687-1691.

Gas Separation Membrane

Structures of the gas separation membrane of the present invention will be described.

Composite Gas Separation Membrane

In a composite gas separation membrane which is a preferred embodiment of the gas separation membrane of the present invention (hereinafter, may be referred to as "composite membrane of the present invention"), a gas separation layer containing the crosslinked cellulose resin described above is formed on the upper side of a gas-permeable support layer (porous layer). As described later, this composite membrane can be formed by applying, to at least a surface of a porous support, a coating solution (dope) containing components (a cellulose resin and a crosslinking agent) that form the gas separation layer, and forming a crosslinked structure. The term "applying" (or "coating") used herein includes a manner of deposition on a surface by immersion.

Figure 2:
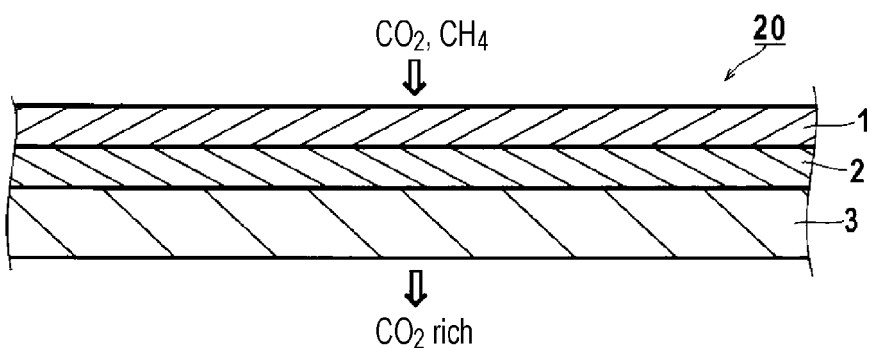
FIG. 2 is a schematic sectional view illustrating a gas separation membrane according to another preferred embodiment (composite membrane) of the present invention.
Figure 3:
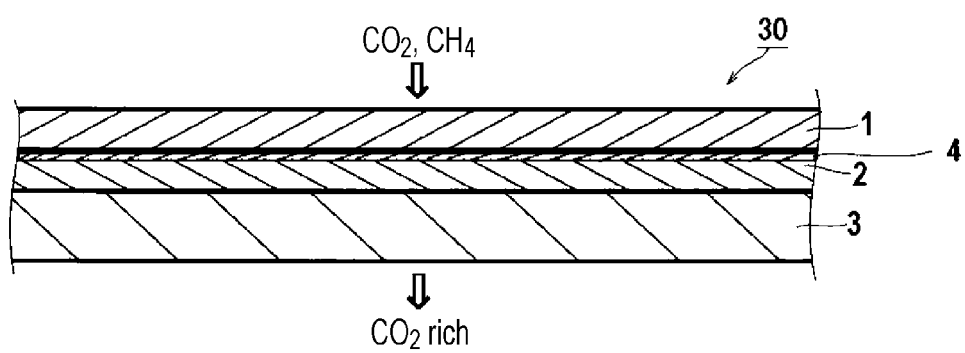
FIG. 3 is a schematic sectional view illustrating a gas separation membrane according to still another preferred embodiment (composite membrane) of the present invention.

FIG. 1 is a schematic vertical sectional view illustrating a composite gas separation membrane 10 according to a preferred embodiment of the present invention. The composite gas separation membrane 10 has a gas separation layer 1 and a porous layer 2. FIG. 2 is a schematic sectional view illustrating a composite gas separation membrane 20 according to another preferred embodiment of the present invention. In this embodiment, in addition to the gas separation layer 1 and the porous layer 2, a nonwoven fabric layer 3 is provided as an additional support layer. FIG. 3 is a schematic sectional view illustrating a composite gas separation membrane 30 according to still another preferred embodiment of the present invention. In this embodiment, in addition to the gas separation layer 1, the porous layer 2, and the nonwoven fabric layer 3, a smooth layer 4 is provided as an underlayer of the gas separation layer 1 so as to be in contact with the gas separation layer.

Herein, the term "on the upper side of a support layer" means that another layer may be disposed between a support layer and a gas separation layer. Regarding the expression of the upper and lower sides, the side to which target gas to be separated is supplied is defined as the "upper side", and the side from which the separated gas is discharged is defined as the "lower side" unless otherwise stated.

Herein, the term "having gas permeability" means that when carbon dioxide is supplied to a support layer (a membrane consisting of a support layer) at a total pressure on the gas supply side of 4 MPa at a temperature of 40° C., the permeation rate of the carbon dioxide is $1 \times 10^{-5}$ cm$^3$ (STP)/cm$^2 \cdot$sec$\cdot$cmHg (10 GPU) or more. The gas permeability is preferably 20 GPU or more, more preferably 50 GPU or more, and still more preferably 100 GPU or more.

In the composite membrane of the present invention, a gas separation layer may be formed and disposed on a surface and/or in an inner surface of a porous layer. A composite membrane can be easily obtained by forming a gas separation layer at least on a surface of a porous layer. Formation of a gas separation layer at least on a surface of a porous layer can provide a composite membrane having an advantage that high separation selectivity, high gas permeability, and mechanical strength are combined. The thickness of the separation layer is preferably as small as possible under conditions in which high gas permeability is provided while mechanical strength and separation selectivity are maintained.

In the composite membrane of the present invention, the thickness of the gas separation layer is not particularly limited, but is preferably 0.01 to 5.0 μm, more preferably 0.05 to 2.0 μm, and still more preferably 0.05 to 1.0 μm.

The porous layer is not particularly limited as long as the purpose of providing mechanical strength and high gas permeability is satisfied. The porous layer may be formed of an organic material or an inorganic material. The porous layer is preferably a porous membrane formed of an organic polymer. The thickness of the porous layer is 1 to 3,000 μm, preferably 5 to 500 μm, and more preferably 5 to 150 μm. Regarding the pore structure of the porous layer, the average pore size is usually 10 μm or less, preferably 0.5 μm or less, and more preferably 0.2 μm or less. The porosity is preferably 20% to 90%, and more preferably 30% to 80%.

The porous layer preferably has a molecular weight cut-off of 100,000 or less. Furthermore, the gas permeance of the porous layer is preferably $3 \times 10^{-5}$ cm$^3$ (STP)/cm$^2 \cdot$sec$\cdot$cmHg (30 GPU) or more, more preferably 100 GPU or more, and still more preferably 200 GPU or more in terms of the permeation rate of carbon dioxide at 40° C. and 4 MPa.

Examples of the material of the porous layer include known polymers such as polyolefin resins, e.g., polyethylene and polypropylene; fluorine-containing resins, e.g., polytetrafluoroethylene, polyvinyl fluoride, and polyvinylidene fluoride; and other resins, e.g., polystyrene, cellulose acetate, polyurethane, polyacrylonitrile, polyphenylene oxide, polysulfone, polyethersulfone, polyimide, and polyaramid.

The porous layer may have any shape such as a flat-plate shape, a spiral shape, a tubular shape, or a hollow fiber shape.

The composite membrane of the present invention preferably has a support for providing mechanical strength, the support being disposed on the lower side of the porous layer that forms a gas separation layer. Examples of the support include woven fabrics, nonwoven fabrics, and nets. From the viewpoint of membrane formability and the cost, a nonwoven fabric is suitably used. As the nonwoven fabric, fibers formed of polyester, polypropylene, polyacrylonitrile, polyethylene, polyamide, or the like may be used alone or in combination of two or more thereof. The nonwoven fabric can be produced by, for example, papermaking main fibers and binder fibers that are uniformly dispersed in water with a circular net, a long net, or the like, and drying the fibers with a dryer. Furthermore, for the purpose of, for example, removing fuzz or improving mechanical properties, it is also preferable to perform a thermal pressing process by interposing the nonwoven fabric between two rolls.

In the production of the composite membrane of the present invention, the gas separation layer is preferably formed by applying a coating solution containing at least a cellulose resin and the crosslinking agent described above to a porous layer or a smooth layer, which will be described later, and allowing the cellulose resin and the crosslinking agent to react with each other to form a crosslinked structure. The reaction between the cellulose resin and the crosslinking agent is performed under the reaction conditions suitable for a desired reaction.

For example, when a metal crosslinking is formed by a ligand exchange reaction with a cellulose resin by using, as a crosslinking agent, a metal complex represented by Formula (B) above, the ligand exchange reaction in the coating solution can be suppressed by controlling the concentrations of the cellulose resin and the metal complex functioning as the crosslinking agent in the coating solution to certain values or less. When this coating solution is applied onto a porous support layer so as to form a thin membrane, the ligand exchange reaction rapidly proceeds with the sudden evaporation of a solvent, and a metal-crosslinked structure can be formed in the cellulose resin.

With regard to other crosslinking formation reactions, a coating solution containing a cellulose resin and a crosslinking agent is applied onto a porous support layer, and the resulting porous support layer is placed under the reaction conditions suitable for each reaction form. As a result, a desired crosslinked structure can be formed.

The content of the cellulose resin in the coating solution is not particularly limited, but is preferably 0.1% to 30% by mass, and more preferably 0.5% to 10% by mass. When the content of the cellulose resin is excessively low, the coating solution easily permeates through the lower layer in the formation of a membrane on a porous support. As a result, there is a concern that defects are likely to be generated in a surface layer that contributes to separation. When the content of the cellulose resin is excessively high, in the formation of a membrane on a porous support, pores are filled with the cellulose resin at a high concentration, which may decrease permeability. The gas separation membrane of the present invention can be appropriately produced by adjusting the molecular weight, the structure, the composition, and the solution viscosity of the polymer of the separation layer.

Organic Solvent

As the organic solvent serving as a medium of the coating solution, it is preferable to select a suitable organic solvent that does not erode a support to which the coating solution is to be applied. Examples of the organic solvent that can be used include ketone solvents such as acetone, methyl ethyl ketone, methyl isobutyl ketone, and cyclohexanone; alcohol solvents such as methanol, ethanol, isopropyl alcohol, and tert-butyl alcohol; nitrile solvents such as acetonitrile and benzonitrile; amide solvents such as N-methylpyrrolidone, N-ethylpyrrolidone, dimethylformamide, and dimethylacetamide; halogen-containing solvents such as methylene chloride, chloroform, and dichloroethane; and ether solvents such as tetrahydrofuran, dioxane, and 1,3-dioxolane.

Furthermore, the organic solvent used for the coating solution preferably contains an organic solvent selected from N-methylpyrrolidone, N-ethylpyrrolidone, γ-butyrolactone, dimethyl sulfoxide, dimethylacetamide, dimethylformamide, methylene chloride, tetrahydrofuran, dioxane, and 1,3-dioxolane, more preferably contains an aprotic polar organic solvent selected from methyl ethyl ketone, tetrahydrofuran, 1,3-dioxolane, N-methylpyrrolidone, N-ethylpyrrolidone, dimethylacetamide, dimethylformamide, and dioxane, and still more preferably contains an aprotic polar organic solvent selected from methyl ethyl ketone, tetrahydrofuran, 1,3-dioxolane, N-methylpyrrolidone, N-ethylpyrrolidone, and dimethylacetamide. The aprotic polar organic solvents have relatively high boiling points, and thus the organic solvents can be left in the gas separation layer at a desired concentration. In addition, the polarity can be adjusted by adding a very small amount of a protic solvent such as water or methanol to any of the above preferable aprotic organic solvents so as not to erode a support.

The composite membrane of the present invention contains 10 to 5,000 ppm of an organic solvent in the formed gas separation layer. The composite membrane of the present invention preferably contains 10 to 1,000 ppm, more preferably 30 to 500 ppm, and still more preferably 50 to 500 ppm of an organic solvent in the formed gas separation layer.

Since the gas separation layer is a thin layer, defects tend to be generated by rubbing or folding, which may result in a significant decrease in the gas separation performance. Therefore, a polymer layer having gas permeability is preferably formed as a protective layer on the gas separation layer or as a smooth layer under the gas separation layer so as to be in contact with the gas separation layer.

In particular, the composite membrane of the present invention preferably has, as an upper layer or underlayer that is in contact with the gas separation layer, a functional polymer layer having a group selected from an amino group, a thiol group, a hydrosilyl group, a vinyl group, an acryloyl group, a methacryloyl group, an acid anhydride group, a hydroxy group, and an alkoxy group. When a functional polymer layer having such a group is provided as a smooth layer, adhesiveness between the gas separation layer and the support can be improved, and the gas separation layer can be formed so as to have a more uniform thickness. These effects are more significantly provided when a crosslinked structure is introduced in the functional polymer layer through any of the groups described above. When a functional polymer layer having the specific group is provided as a protective layer, resistance to folding or rubbing can be further enhanced. In addition, a crosslinked structure can be introduced in the protective layer through the particular group. With this structure, durability under conditions of a high temperature, a high pressure, and a high humidity can also be further improved.

Note that even when a crosslinked structure is formed in the functional polymer layer through the particular groups, some of the groups remain as they are in the functional polymer because all of the groups do not necessarily form the crosslinked structure.

Functional Polymer Layer

The functional polymer layer is preferably a siloxane compound layer. When a siloxane compound layer is provided as an underlayer in contact with the gas separation layer, it is possible to smooth the unevenness on the surface of the porous layer and thus a reduction in the thickness of the gas separation layer is easily realized. When a siloxane compound layer is provided as an upper layer in contact with the gas separation layer, the siloxane compound layer functions as a protective layer, and mechanical strength of the gas separation layer can be improved.

Examples of a siloxane compound that form is the siloxane compound layer include compounds whose main chain is formed of a polysiloxane and compounds having a siloxane structure and a non-siloxane structure in a main chain thereof.

Siloxane Compound Whose Main Chain is Formed of Polysiloxane

Examples of the siloxane compound whose main chain is formed of a polysiloxane, the compound being capable of being used as the siloxane compound layer, include at least one polyorganosiloxane represented by Formula (1) or (2) below. Herein, the polyorganosiloxane represented by Formula (1) and the polyorganosiloxane represented by Formula (2) include the forms of crosslinked reaction products thereof. Examples of the crosslinked reaction products include siloxane compounds formed by a reaction between the compound represented by Formula (1) or the compound represented by Formula (2) and a crosslinking agent or a polysiloxane compound having a group that reacts with and links to a reactive group $X^S$.

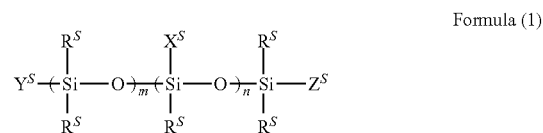

Formula (1)

In Formula (1), $R^S$ represents a non-reactive group and is preferably an alkyl group (preferably an alkyl group having 1 to 18 carbon atoms, and more preferably an alkyl group having 1 to 12 carbon atoms) or an aryl group (preferably an aryl group having 6 to 15 carbon atoms, more preferably an aryl group having 6 to 12 carbon atoms, and still more preferably phenyl).

$X^S$ represents a reactive group and is preferably a group selected from a hydrogen atom, an amino group, a thiol group, a hydrosilyl group, an acryloyl group, a methacryloyl group, an acid anhydride group, an alkoxy group, a halogen atom, a vinyl group, a hydroxy group, and a substituted alkyl group (preferably a substituted alkyl group having 1 to 18 carbon atoms, and more preferably a substituted alkyl group having 1 to 12 carbon atoms).

The substituent of this substituted alkyl group preferably has a group selected from an amino group, a thiol group, a hydrosilyl group, a vinyl group, an acryloyl group, a methacryloyl group, an acid anhydride group, a hydroxy group, and an alkoxy group.

$Y^S$ and $Z^S$ are each $R^S$ or $X^S$ above.

The viscosity of the siloxane compound used in the present invention is not particularly specified. However, the viscosity η60 measured at 25° C. with a B-type viscometer (viscosity at 60 rpm measured at 25° C.) is preferably 10 to 100,000 mPa·s and more preferably 20 to 50,000 mPa·s. In Formula (1), in is a number of 1 or more and is preferably 1 to 100,000.

Furthermore, n is a number of 0 or more and is preferably 0 to 100,000.

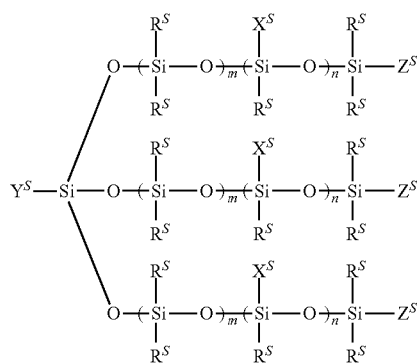

Formula (2)

In Formula (2), $X^S$, $Y^S$, $Z^S$, $R^S$, m, and n respectively have the same definition as $X^S$, $Y^S$, $Z^S$, $R^S$, m, and n in Formula (1).

In Formulae (1) and (2), when the non-reactive group $R^S$ is an alkyl group, examples of the alkyl group include methyl, ethyl, hexyl, octyl, decyl, and octadecyl.

In Formulae (1) and (2), when the reactive group $X^S$ is a substituted alkyl group, preferred examples of the substituted alkyl group include hydroxyalkyl groups having 1 to 18 carbon atoms, preferably having 1 to 10 carbon atoms, more preferably having 1 to 5 carbon atoms, and still more preferably having 1 to 3 carbon atoms; aminoalkyl groups having 1 to 18 carbon atoms, preferably having 1 to 10 carbon atoms, and more preferably having 1 to 5 carbon atoms; (meth)acryloxyalkyl groups having 1 to 18 carbon atoms, preferably having 1 to 10 carbon atoms, and more preferably having 1 to 6 carbon atoms; and mercaptoalkyl groups having 1 to 18 carbon atoms, preferably having 1 to 10 carbon atoms, and more preferably having 1 to 5 carbon atoms.

In Formulae (1) and (2), in and n are each preferably a number with which the molecular weight of the compound becomes 5,000 to 1,000,000.

In Formulae (1) and (2), the distribution of siloxane units which have a reactive group (in the formulae, structural units whose number is represented by n) and siloxane units which do not have a reactive group (in the formulae, structural units whose number is represented by m) is not particularly limited. Specifically, in Formulae (1) and (2), (Si($R^S$)($R^S$)—) units and (Si($R^S$)($X^S$)—O) units may be distributed in a random manner (that is, m and n do not represent block structures but simply represent the numbers of moles of the repeating units).

Compounds Having Siloxane Structure and Non-Siloxane Structure in Main Chain Thereof Examples of the compound having a siloxane structure and a non-siloxane structure in a main chain thereof, the compound being capable of being used as the siloxane compound layer, include compounds represented by Formulae (3) to (7) below.

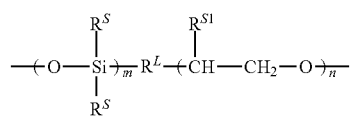

Formula (3)

In formula (3), $R^S$, m, and n respectively have the same definition as $R^S$, m, and n in Formula (1); $R^L$ represents —O— or —$CH_2$—; and $R^{S1}$ represents a hydrogen atom or methyl. Both terminals of Formula (3) are each preferably an amino group, a thiol group, a hydroxy group, a hydrosilyl group, a vinyl group, or a substituted alkyl group. This substituted alkyl group has the same definition as the substituted alkyl group in Formula (1) above, and the preferred form of the substituted alkyl group is also the same as that of the substituted alkyl group in Formula (1).

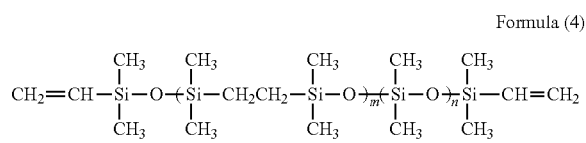

Formula (4)

In formula (4), m and n respectively have the same definition as m and n in Formula (1).

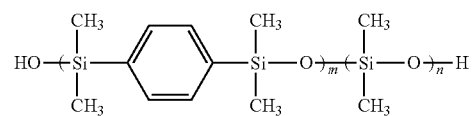

Formula (5)

In formula (5), m and n respectively have the same definition as m and n in Formula (1).

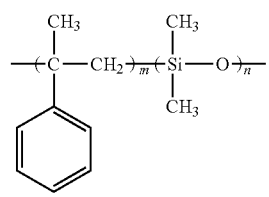

Formula (6)

In formula (6), m and n respectively have the same definition as m and n in Formula (1). Both terminals of Formula (6) are each preferably bonded to an amino group, a thiol group, a hydroxy group, a hydrosilyl group, a vinyl group, or a substituted alkyl group. This substituted alkyl group has the same definition as the substituted alkyl group in Formula (1) above, and the preferred form of the substituted alkyl group is also the same as that of the substituted alkyl group in Formula (1).

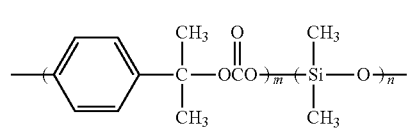

Formula (7)

In formula (7), m and n respectively have the same definition as m and n in Formula (1). Both terminals of Formula (7) are each preferably bonded to an amino group, a thiol group, a hydroxy group, a hydrosilyl group, a vinyl group, or a substituted alkyl group. This substituted alkyl group has the same definition as the substituted alkyl group in Formula (1) above, and the preferred form of the substituted alkyl group is also the same as that of the substituted alkyl group in Formula (1).

In Formulae (3) to (7), siloxane structural units and non-siloxane structural units may be distributed in a random manner (that is, m and n do not represent block structures but simply represent the numbers of moles of the repeating units).

The compound having a siloxane structure and a non-siloxane structure in a main chain thereof preferably contains a siloxane structural unit in an amount of 50% by mole or more, and more preferably in an amount of 70% by mole or more relative to the total number of moles of all the repeating structural units.

The siloxane compound used in the siloxane compound layer preferably has a weight-average molecular weight of 5,000 to 1,000,000 from the viewpoint of realizing durability and a reduction in the thickness of the membrane. The method for measuring the weight-average molecular weight is as described above.

Preferred examples of the siloxane compound constituting the siloxane compound layer will be listed below.

Examples thereof include at least one selected from dimethylsiloxane-methylvinylsiloxane copolymers, dimethylsiloxane-diphenylsiloxane-methylvinylsiloxane copolymers, methyl-3,3,3-trifluoropropylsiloxane-methylvinylsiloxane copolymers, dimethylsiloxane-methylphenylsiloxane-methylvinylsiloxane copolymers, vinyl-terminated diphenylsiloxane-dimethylsiloxane copolymers, vinyl-terminated polydimethylsiloxane, and dimethylsiloxane-methylhydro siloxane copolymers. These siloxane compounds include the forms of crosslinked reaction products thereof.

That is, the siloxane compound constituting the siloxane compound layer preferably has a polydimethylsiloxane structure.

In the composite membrane of the present invention, the thickness of the siloxane compound layer is preferably 0.01 to 5 µm, and more preferably 0.05 to 1 µm from the viewpoint of smoothness and gas permeability.

The gas permeance of the siloxane compound layer at 40° C. and 4 MPa is preferably 100 GPU or more, more preferably 300 GPU or more, and still more preferably 1,000 GPU or more in terms of the permeation rate of carbon dioxide.

Asymmetric Gas Separation Membrane

Figure 4:
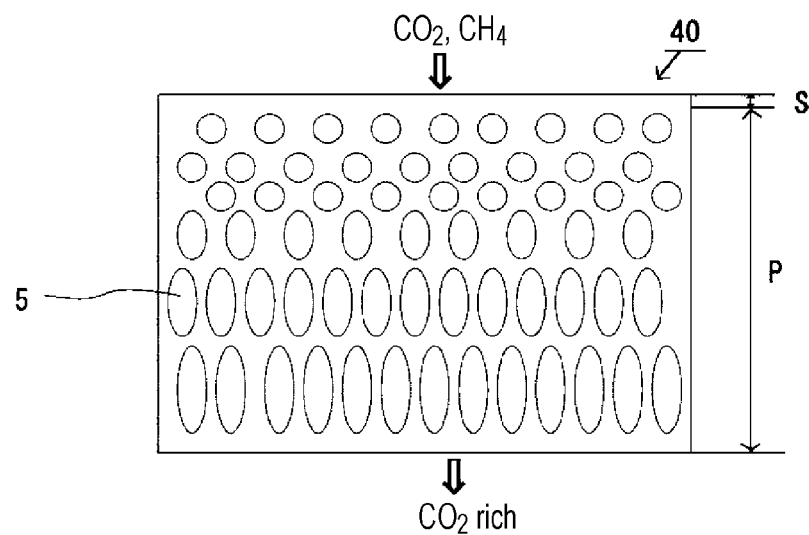
FIG. 4 is a schematic view illustrating a gas separation membrane according to still another preferred embodiment (asymmetric membrane) of the present invention.

Another preferred embodiment of the gas separation membrane of the present invention is a form of an asymmetric membrane. FIG. 4 is a schematic view illustrating a preferred embodiment of an asymmetric gas separation membrane of the present invention. In this asymmetric gas separation membrane, a thin skin layer (S, dense layer, gas separation layer) that contributes to gas separation is formed on the gas supply side. A portion other than the skin layer is a thick porous layer (P). This porous layer functions as a support. The porous layer (P) has pores penetrating from an end on the upper side thereof to an end on the lower side thereof. Unlike the dense layer (S), the porous layer (P) does not have a gas separation capability.

The asymmetric gas separation membrane of the present invention (hereinafter, may be referred to as "asymmetric membrane of the present invention") can be formed by a phase inversion process using a solution (dope solution) containing a cellulose resin and a crosslinking agent. The phase inversion process is a known process for forming a membrane by bringing a dope solution into contact with a coagulating liquid while causing a phase inversion, and a so-called dry-wet process is suitably used in the present invention. The dry-wet process includes evaporating a solution on a surface of a dope solution that is formed to have a membrane shape, and subsequently immersing the resulting membrane in a coagulating liquid (a solvent which is compatible with a solvent of the dope solution and in which the cellulose resin and the crosslinking agent are insoluble) to form a dense layer and to simultaneously form a porous layer by forming fine pores using a phase-separation phenomenon that occurs at this time. This process was suggested by Loeb, Sourirajan, et al. (for example, the specification of U.S. Pat. No. 3,133,132).

A medium used in the preparation of the dope solution is preferably a solvent miscible with the coagulating liquid so as to cause phase inversion. More preferably, as the medium of the dope solution, an aprotic polar organic solvent selected from N-methylpyrrolidone, N-ethylpyrolidone, γ-butyrolactone, dimethyl sulfoxide, dimethylacetamide, dimethylformamide, methylene chloride, tetrahydrofuran, dioxane, and 1,3-dioxolane is at least used. It is also preferable that a solvent such as a ketone, an alcohol, acetonitrile, or water be further mixed with any of the solvents mentioned above to prepare the medium of the dope solution.

The coagulating liquid is preferably formed of a mixture of water and a protic polar solvent (preferably, an alcohol).

A method for producing an asymmetric membrane of the present invention will be described by using, as an example, a case where an asymmetric membrane of the present invention is formed by using a crosslinked cellulose resin having a metal crosslinked structure.

The production method includes a step of applying, onto a support, a coating solution (dope solution) containing a metal complex (preferably a metal complex represented by Formula (B) above) and a cellulose resin having an active hydrogen-containing group (e.g., a hydroxy group, a carboxy group, a sulfo group, or a thiol group) (a step of applying a dope solution onto a support so as to have a membrane shape); a step of drying a surface of the coating solution on the support; and a step of bringing the coating solution on the support into contact with a coagulating liquid to form an asymmetric structure by phase inversion.

In the step of phase inversion, the formation of crosslinking of the cellulose resin proceeds at the same time.

In the step of drying a surface of the coating solution, a solvent is volatilized from the surface of the coating solution on the support, and moisture in the air is absorbed. As a result, the surface becomes solidified easily, and it is possible to stabilize the thickness of the dense layer (skin layer) formed when the resulting membrane is brought into contact with the coagulating liquid.

With regard to crosslinked structures other than the metal crosslinked structure, crosslinked structures having desired linking structures can be formed by applying a dope solution containing a cellulose resin and a crosslinking agent onto a support, and subsequently conducting the formation of a skin layer and phase inversion under conditions suitable for respective crosslinking reactions.

Examples of the support to which the dope solution is applied include gas-permeable porous membranes such as nanofiltration membranes, ultrafiltration membranes, microfiltration membranes, woven fabrics, and nonwoven fabrics. Of these, nonwoven fabrics are preferable. The forms of preferred nonwoven fabrics are the same as those in the description of the composite membranes. When a dope solution is applied onto a porous membrane such as a nonwoven fabric, part of the dope solution permeates through pores of the porous membrane, and a phase-separation phenomenon occurs in this state. Therefore, the resulting asymmetric membrane formed of a crosslinked cellulose resin is integrated with the porous membrane such as a nonwoven fabric to form a gas separation membrane. Herein, this state is denoted by the phrase "an asymmetric membrane is supported by a porous membrane".

The thickness of the asymmetric membrane of the present invention is preferably 10 to 200 µm (when the asymmetric membrane is supported by a porous membrane such as a nonwoven fabric, the term "thickness" refers to a thickness including the thickness of the porous membrane). The thickness of the surface layer (i.e., gas separation layer) that is referred to as a dense layer or a skin layer and that contributes to gas separation is not particularly limited. However, from the viewpoint of providing practical gas permeability, the thickness of the surface layer is preferably 0.01 to 5.0 µm more preferably 0.05 to 2.0 µm, and still more preferably 0.05 to 1.0 µm.

The asymmetric gas separation membrane of the present invention may be a flat membrane or a hollow-fiber membrane. Asymmetric hollow-fiber membranes can be produced by a dry-wet spinning process. The dry-wet spinning process is a process for producing an asymmetric hollow-fiber membrane by applying a dry-wet process to a dope solution which is ejected from a spinning nozzle to have a desired hollow fiber shape. More specifically, a dope solution is ejected from a nozzle to have a desired shape hollow fiber shape and is allowed to pass through the air or a nitrogen gas atmosphere immediately after the ejection, and the resulting dope solution is then immersed in a coagulating liquid to form an asymmetric structure. Subsequently, the asymmetric structure is dried and heat-treated, as needed, to produce an asymmetric membrane. The coagulating liquid does not substantially dissolve a cellulose resin and a crosslinking agent and is compatible with a solvent of the dope solution.

The solution viscosity of the dope solution to be ejected from a nozzle is 2 to 17,000 Pa·s, preferably 10 to 1,500 Pa·s, and particularly preferably 20 to 1,000 Pa·s at an ejection temperature (for example, 10° C.) because the shape after ejection, such as a hollow fiber shape, can be stably obtained. It is preferable that immersion in a coagulating liquid be performed by immersing the ejected dope solution in a primary coagulating liquid to be coagulated to such an extent that the shape of the membrane such as a hollow fiber can be maintained, then winding the resulting membrane around a guide roll, and subsequently immersing the membrane in a secondary coagulating liquid so as to sufficiently coagulate the whole membrane. It is effective that the coagulated membrane is dried after the coagulating liquid is substituted with a solvent such as a hydrocarbon.

In the gas separation membrane of the present invention, the content of the crosslinked cellulose resin in the gas separation layer is not particularly limited as long as a desired gas separation performance is obtained. From the viewpoint of improving the gas separation performance, the content of the crosslinked cellulose resin in the gas separation layer is preferably 20% by mass or more, more preferably 40% by mass or more, still more preferably 60% by mass or more, and even still more preferably 70% by mass or more. The content of the crosslinked cellulose resin in the gas separation layer is usually 99% by mass or less.

Use and Characteristics of Gas Separation Membrane

The gas separation membranes (composite membranes and asymmetric membranes) of the present invention can be suitably used for gas separation-recovery and gas separation-purification. For example, it is possible to obtain gas separation membranes that are capable of efficiently separating specific gas from a gas mixture containing gas such as hydrogen, helium, carbon monoxide, carbon dioxide, hydrogen sulfide, oxygen, nitrogen, ammonia, sulfur oxides, nitrogen oxides, hydrocarbons, e.g., methane and ethane, unsaturated hydrocarbons, e.g., propylene, and perfluoro compounds, e.g., tetrafluoroethane. In particular, it is preferable to obtain a gas separation membrane that selectively separates carbon dioxide from a gas mixture containing carbon dioxide and a hydrocarbon (methane).

When the gas to be subjected to a separation treatment is mixed gas of carbon dioxide and methane, the permeation rate of carbon dioxide at 40° C. and 5 MPa is preferably more than 20 GPU, more preferably more than 30 GPU, and still more preferably 50 to 500 GPU. The ratio of the permeation rate of carbon dioxide to the permeation rate of methane ($R_{CO2}/R_{CH4}$, may be referred to as separation selectivity) is preferably 15 or more, more preferably 20 or more, still more preferably 23 or more, and particularly preferably 25 to 50 where $R_{CO2}$ represents the permeation rate of carbon dioxide and $R_{CH4}$ represents the permeation rate of methane.

Note that 1 GPU is $1\times10^{-6}$ cm$^3$ (STP)/cm$^2$·sec·cmHg.

Other Components

In order to adjust membrane physical properties, various polymer compounds may also be added to the gas separation layer of the gas separation membrane of the present invention. Examples of the polymer compounds that can be used include acrylic polymers, polyurethane resins, polyamide resins, polyester resins, epoxy resins, phenolic resins, polycarbonate resins, polyvinyl butyral resins, polyvinyl formal resins, shellac, vinyl resins, acrylic resins, rubber resins, waxes, and other natural resins. These polymer compounds may be used in combination of two or more thereof.

In order to adjust liquid physical properties, for example, a nonionic surfactant, a cationic surfactant, or an organofluorine compound may also be added.

Specific examples of the surfactants include anionic surfactants such as alkyl benzene sulfonates, alkyl naphthalene sulfonates, higher fatty acid salts, sulfonates of higher fatty acid esters, sulfuric acid ester salts of higher alcohol ethers, sulfonates of higher alcohol ethers, alkyl carboxylates of higher alkyl sulfonamides, and alkyl phosphates; nonionic surfactants such as polyoxyethylene alkyl ethers, polyoxyethylene alkyl phenyl ethers, polyoxyethylene fatty acid esters, sorbitan fatty acid esters, ethylene oxide adducts of acetylene glycol, ethylene oxide adducts of glycerin, and polyoxyethylene sorbitan fatty acid esters; amphoteric surfactants such as alkyl betaines and amide betaines; silicon-based surfactants; and fluorine-based surfactants. The surfactant can be suitably selected from known surfactants including the above specific examples and derivatives thereof.

A high-molecular-weight dispersant may also be contained. Specific examples of the high-molecular-weight dispersant include polyvinylpyrrolidone, polyvinyl alcohol, polyvinyl methyl ether, polyethylene oxide, polyethylene glycol, polypropylene glycol, and polyacrylamide. Of these, polyvinylpyrrolidone is preferably used.

The conditions for forming the gas separation membrane of the present invention are not particularly limited. The temperature is preferably −30° C. to 100° C., more preferably −10° C. to 80° C., and particularly preferably 5° C. to 50° C.

In the present invention, during the formation of the membrane, gas such as air or oxygen may be allowed to coexist. However, it is desirable that the membrane be formed under an inert gas atmosphere.

Method for Separating Gas Mixture

A gas separation method of the present invention is a method that includes selectively allowing permeation of specific gas from mixed gas containing two or more types of gas by using the gas separation membrane of the present invention to perform separation. In particular, the gas separation method of the present invention is preferably a method that includes selectively allowing permeation of carbon dioxide from mixed gas containing carbon dioxide and methane. The pressure of gas during the gas separation is preferably 0.5 to 10 MPa, more preferably 1 to 10 MPa, and still more preferably 2 to 7 MPa.

The temperature of gas when the gas separation method of the present invention is performed is preferably −30° C. to 90° C., and more preferably 15° C. to 70° C. In the mixed gas containing carbon dioxide and methane gas, the mixing ratio of carbon dioxide to methane gas is not particularly limited. The mixing ratio is preferably carbon dioxide:methane gas=1:99 to 99:1 (volume ratio) and more preferably carbon dioxide:methane gas=5:95 to 90:10 (volume ratio).

Gas Separation Module and Gas Separation Apparatus

A gas separation module can be prepared by using the gas separation membrane of the present invention. Examples of the module include a spiral-type module, a hollow fiber-type module, a pleated module, a tubular module, and a plate & frame-type module.

Furthermore, a gas separation apparatus having means for performing separation and recovery of gas or performing separation and purification of gas can be obtained by using the gas separation membrane or the gas separation module of the present invention. The gas separation membrane of the present invention may be applied to a gas separation-recovery apparatus for a membrane/absorption hybrid method in which a membrane is used in combination with an absorption liquid, as described in, for example, Japanese Unexamined Patent Application Publication No. 2007-297605.

EXAMPLES

The present invention will be described in more detail with reference to Examples. The present invention is not limited to these Examples.

[Example 1] Preparation of Asymmetric Membrane (Metal Crosslinking)

To 0.5 g of cellulose acetate (trade name: L-70, available from Daicel Corporation, acetylation degree 0.55, where the term "acetylation degree" refers to a weight percentage of bonded acetic acid per unit weight) serving as a cellulose resin, a mixture of 2.5 g of methyl ethyl ketone, 2.5 g of N,N-dimethylformamide (DMF), and 0.6 g of n-butanol was added to dissolve the cellulose acetate. Subsequently, 0.015 g of tris(2,4-pentanedionato)aluminum(III) (aluminum acetylacetonate) (0.046 mmol, available from Tokyo Chemical Industry Co., Ltd., Product No.: A0241) was added as a crosslinking agent to the resulting solution. The solution was filtered with a PTFE microfiltration membrane having a pore size of 5.0 μm to prepare a dope solution.

A polyester nonwoven fabric (available from Awa Paper Mfg. Co., Ltd., thickness: 95 μm) was placed on a clean glass plate (10 cm in length×10 cm in width×1 mm in thickness), and the dope solution was applied onto the nonwoven fabric at room temperature (20° C.). The resulting glass plate was allowed to stand for 30 seconds and then immersed in a primary coagulating liquid (0° C., 75% by weight methanol aqueous solution) for one hour. Subsequently, the glass plate was further immersed in a secondary coagulating liquid (0° C., 75% by weight methanol aqueous solution) for one hour to prepare an asymmetric membrane. The prepared asymmetric membrane was washed with methanol, and the methanol was then replaced by isooctane. Furthermore, the asymmetric membrane was heated at 50° C. for eight hours and at 110° C. for six hours to evaporate and dry the isooctane. In this manner, a crosslinked cellulose asymmetric membrane (gas separation membrane) in which the thickness of a dense skin layer was 0.1 μm or less and a total thickness of a polymer layer was 40 μm was obtained. This asymmetric membrane (gas separation membrane) had a thickness of 95 μm, which included the thickness of the nonwoven fabric.

[Examples 2 to 24] Preparation of Asymmetric Membranes (Metal Crosslinking)

Asymmetric membranes (gas separation membranes) were prepared as in Example 1 except that, in Example 1, the cellulose resin was changed as described in Table 1, the type and the amount of crosslinking agent added were changed as described in Table 1, and the DMF was changed to the organic solvents described in Table 1.

[Example 25] Preparation of Asymmetric Membrane (Crosslinking by Reaction Between Functional Groups)

To 0.5 g of cellulose acetate (trade name: L-70, available from Daicel Corporation, acetylation degree 0.55, where the term "acetylation degree" refers to a weight percentage of bonded acetic acid per unit weight), a mixture of 2.5 g of methyl ethyl ketone, 2.5 g of N,N-dimethylformamide, and 0.6 g of n-butanol was added to dissolve the cellulose acetate. Subsequently, 0.05 g of ethyl chloroformate (0.46 mmol, available from Tokyo Chemical Industry Co., Ltd., Product No.: C0177) was added to the resulting solution. The solution was filtered with a PTFE microfiltration membrane having a pore size of 5.0 μm to prepare a dope solution.

A polyester nonwoven fabric (available from Awa Paper Mfg. Co., Ltd., thickness: 95 μm) was placed on a clean glass plate (10 cm in length×10 cm in width×1 mm in thickness), and the dope solution was further extended on the nonwoven fabric in an environment at room temperature (20° C.). The resulting glass plate was allowed to stand for 30 seconds and then immersed in a primary coagulating liquid (0° C., 75% by weight methanol aqueous solution) for one hour. Subsequently, the glass plate was further immersed in a secondary coagulating liquid (0° C., 75% by weight methanol aqueous solution) for one hour to prepare an asymmetric membrane. The prepared asymmetric membrane was washed with methanol, and the methanol was then replaced by isooctane. Furthermore, the asymmetric membrane was heated at 50° C. for eight hours and at 110° C. for six hours to evaporate and dry the isooctane. In this manner, a crosslinked cellulose asymmetric membrane (gas separation membrane) in which the thickness of a dense skin layer was 0.1 μm or less and a total thickness of a polymer layer was 40 μm was obtained.

[Examples 26 to 31] Preparation of Asymmetric Membranes (Crosslinking by Reaction Between Functional Groups)

Asymmetric membranes (gas separation membranes) were prepared as in Example 25 except that, in Example 25, the cellulose resin and the crosslinking agent were changed as described in Table 1.

[Comparative Examples 1 to 6] Preparation of Asymmetric Membranes (No Crosslinking or Urethane Crosslinking)

Asymmetric membranes (gas separation membranes) of Comparative Examples 1 to 6 were prepared as in Example 1 except that, in Example 1, the cellulose resin was changed as described in Table 1, and the type and the amount of crosslinking agent added were changed as described in Table 1.

[Comparative Example 7] Preparation of Asymmetric Membrane (Metal Crosslinking)

An asymmetric membrane (gas separation membrane) of Comparative Example 7 was prepared as in Example 1 except that, in Example 1, the step of conducting heating at 50° C. for eight hours and at 110° C. for six hours to evaporate and dry isooctane was changed to a step of conducting drying at room temperature (about 25° C.) for one hour to evaporate and dry isooctane.

[Comparative Example 8] Preparation of Asymmetric Membrane (Crosslinking by Reaction Between Functional Groups)

An asymmetric membrane (gas separation membrane) of Comparative Example 8 was prepared as in Example 25 except that, in Example 25, the step of conducting heating at 50° C. for eight hours and at 110° C. for six hours to evaporate and dry isooctane was changed to a step of conducting drying at room temperature (about 25° C.) for one hour to evaporate and dry isooctane.

[Comparative Example 9] Preparation of Asymmetric Membrane (Crosslinking by Reaction Between Functional Groups)

An asymmetric membrane (gas separation membrane) of Comparative Example 9 was prepared as in Example 27 except that, in Example 27, the step of conducting heating at 50° C. for eight hours and at 110° C. for six hours to evaporate and dry isooctane was changed to a step of conducting drying at room temperature (about 25° C.) for one hour to evaporate and dry isooctane.

[Comparative Example 10] Preparation of Asymmetric Membrane (Metal Crosslinking)

An asymmetric membrane (gas separation membrane) of Comparative Example 10 was prepared as in Example 1 except that, in Example 1, the step of conducting heating at 50° C. for eight hours and at 110° C. for six hours to evaporate and dry isooctane was changed to a step of conducting heating at 50° C. for eight hours and at 110° C. for six hours and then further conducting heating and drying at 90° C. for one week to evaporate and dry isooctane.

[Comparative Example 11] Preparation of Asymmetric Membrane (Crosslinking by Reaction Between Functional Groups)

An asymmetric membrane (gas separation membrane) of Comparative Example 11 was prepared as in Example 25 except that, in Example 25, the step of conducting heating at 50° C. for eight hours and at 110° C. for six hours to evaporate and dry isooctane was changed to a step of conducting heating at 50° C. for eight hours and at 110° C. for six hours and then further conducting heating and drying at 90° C. for one week to evaporate and dry isooctane.

[Comparative Example 12] Preparation of Asymmetric Membrane (Crosslinking by Reaction Between Functional Groups)

An asymmetric membrane (gas separation membrane) of Comparative Example 12 was prepared as in Example 27 except that, in Example 27, the step of conducting heating at 50° C. for eight hours and at 110° C. for six hours to evaporate and dry isooctane was changed to a step of conducting heating at 50° C. for eight hours and at 110° C. for six hours and then further conducting heating and drying at 90° C. for one week to evaporate and dry isooctane.

In Table 1 below, the abbreviation "acac" represents an acetylacetonato group, and the abbreviation "OiPr" represents isopropoxy.

The "condensing agent" is 1-(3-dimethylaminopropyl)-3-ethylcarbodiimide hydrochloride.

In the column of the main solvent, the abbreviation "DMF" represents N,N-dimethylformamide, the abbreviation "NMP" represents N-methyl-2-pyrrolidone, the abbreviation "NEP" represents N-ethyl-2-pyrrolidone, the abbreviation "DMSO" represents dimethyl sulfoxide, and the abbreviation "DMAc" represents dimethylacetamide.

In the Examples, cellulose resins having a weight-average molecular weight in the range of 30,000 to 300,000 were used as the raw materials of the cellulose resins before the formation of crosslinking.

TABLE 1

| | Cellulose resin | | Crosslinking agent | | | |
|---|---|---|---|---|---|---|
| | Cellulose derivatives | Trade name/Synthesis method | Compound | Amount added relative to 100 parts by mass of cellulose resin (parts by mass) | Main solvent | Linking structure in crosslinked structure |
| Example 1 | R = H, COCH$_3$ | Cellulose acetate L-70 (available from Daicel Corporation) | Al(acac)$_3$ | 3 | DMF | —O—Al—O— |
| Example 2 | R = H, COCH$_3$ | Cellulose acetate LT-55 (available from Daicel Corporation) | Al(OiPr)$_3$ | 5 | DMF | —O—Al—O— |

TABLE 1-continued

| | Cellulose resin | | Crosslinking agent | | | |
|---|---|---|---|---|---|---|
| | Cellulose derivatives | Trade name/Synthesis method | Compound | Amount added relative to 100 parts by mass of cellulose resin (parts by mass) | Main solvent | Linking structure in crosslinked structure |
| Example 3 | R = H, COCH$_3$ | Cellulose acetate L-30 (available from Daicel Corporation) | Al(acac)$_3$ | 8 | DMF | —O—Al—O— |
| Example 4 | R = H, COCH$_3$ | Cellulose acetate L-50 (available from Daicel Corporation) | Al(acac)$_3$ | 15 | NMP | —O—Al—O— |
| Example 5 | R = CH$_2$CO$_2$H | Carboxymethylcellulose Sanlose A045H (available from Shin-Etsu Chemical Co., Ltd.) | FeCl$_3$ | 5 | NMP | —O—Fe—O— |
| Example 6 | R = H, COCH$_3$ | Cellulose acetate L-70 (available from Daicel Corporation) | Ga(acac)$_3$ | 1 | NMP | —O—Ga—O— |
| Example 7 | R = H, COCH$_3$, COC$_6$H$_4$CO$_2$H | Cellulose acetate phthalate 038-01702 (available from Wako Pure Chemical Industries, Ltd.) | In(acac)$_3$ | 1 | NMP | —O—In—O— |
| Example 8 | R = H, COCH$_3$, COC$_6$H$_4$CO$_2$H | Cellulose acetate phthalate 038-01702 (available from Wako Pure Chemical Industries, Ltd.) | Ti(OiPr)$_4$ | 0.5 | NMP | —O—Ti—O— |
| Example 9 | R = H, COCH$_3$, COC$_6$H$_4$CO$_2$H | Cellulose acetate phthalate 038-01702 (available from Wako Pure Chemical Industries, Ltd.) | Ti(OiPr)$_4$ | 1 | NMP | —O—Ti—O— |
| Example 10 | R = H, COCH$_3$, COC$_6$H$_4$CO$_2$H | Cellulose acetate phthalate 038-01702 (available from Wako Pure Chemical Industries, Ltd.) | Zr(OiPr)$_4$ | 0.5 | NMP | —O—Zr—O— |
| Example 11 | R = H, COCH$_3$, COC$_6$H$_4$CO$_2$H | Cellulose acetate phthalate 038-01702 (available from Wako Pure Chemical Industries, Ltd.) | Cu(acac)$_2$ | 0.5 | NMP | —O—Cu—O— |
| Example 12 | R = H, COCH$_3$, COC$_6$H$_4$CO$_2$H | Cellulose acetate phthalate 038-01702 (available from Wako Pure Chemical Industries, Ltd.) | Co(acac)$_2$ | 1 | NMP | —O—Co—O— |
| Example 13 | R = H, COCH$_3$, COC$_6$H$_4$CO$_2$H | Cellulose acetate phthalate 038-01702 (available from Wako Pure Chemical Industries, Ltd.) | Al(OiPr)$_3$ | 8 | NMP | —O—Al—O— |
| Example 14 | R = H, COCH$_3$, COC$_6$H$_4$CO$_2$H | Cellulose acetate phthalate 038-01702 (available from Wako Pure Chemical Industries, Ltd.) | Ni(acac)$_2$ | 0.5 | NMP | —O—Ni—O— |
| Example 15 | R = H, COCH$_3$, COC$_6$H$_4$CO$_2$H | Cellulose acetate phthalate 038-01702 (available from Wako Pure Chemical Industries, Ltd.) | Ga(acac)$_3$ | 5 | NMP | —O—Ga—O— |
| Example 16 | R = H, COCH$_3$, COC$_6$H$_4$CO$_2$H | Cellulose acetate phthalate 038-01702 (available from Wako Pure Chemical Industries, Ltd.) | B(OH)$_3$ | 15 | NMP | —O—B—O— |
| Example 17 | R = H, COCH$_3$ | Cellulose acetate L-70 (available from Daicel Corporation) | Al(acac)$_3$ | 3 | NMP | —O—Al—O— |
| Example 18 | R = H, COCH$_3$ | Cellulose acetate L-70 (available from Daicel Corporation) | Al(acac)$_3$ | 3 | NEP | —O—Al—O— |
| Example 19 | R = H, COCH$_3$ | Cellulose acetate L-70 (available from Daicel Corporation) | Al(acac)$_3$ | 3 | γ-Butyrolactone | —O—Al—O— |
| Example 20 | R = H, COCH$_3$ | Cellulose acetate CA-398-3 (available from Eastman Chemical Company) | Al(acac)$_3$ | 3 | DMSO | —O—Al—O— |
| Example 21 | R = H, COCH$_3$ | Cellulose acetate CA-435-75S (available from Eastman Chemical Company) | Al(acac)$_3$ | 3 | DMAc | —O—Al—O— |

TABLE 1-continued

| | Cellulose resin | | Crosslinking agent | | | |
|---|---|---|---|---|---|---|
| | Cellulose derivatives | Trade name/Synthesis method | Compound | Amount added relative to 100 parts by mass of cellulose resin (parts by mass) | Main solvent | Linking structure in crosslinked structure |
| Example 22 | R = H, COCH$_3$ | Cellulose acetate L-70 (available from Daicel Corporation) | Al(acac)$_3$ | 3 | CH$_2$Cl$_2$ | —O—Al—O— |
| Example 23 | R = H, COCH$_3$ | Cellulose acetate L-70 (available from Daicel Corporation) | Al(acac)$_3$ | 3 | Dioxane | —O—Al—O— |
| Example 24 | R = H, COCH$_3$ | Cellulose acetate L-70 (available from Daicel Corporation) | Al(acac)$_3$ | 3 | 1,3-Dioxolane | —O—Al—O— |
| Example 25 | R = H, COCH$_3$ | Cellulose acetate L-70 (available from Daicel Corporation) | Ethyl chloroformate | 10 | DMF | —OC(=O)O— |
| Example 26 | R = H, COCH$_3$, COC$_6$H$_4$CO$_2$H | Cellulose acetate phthalate 038-01702 (available from Wako Pure Chemical Industries, Ltd.) | Condensing agent + Ethylene-diamine | 10 | DMF | —NHCO— |
| Example 27 | Hydroxyethyl-modified cellulose acetate | Synthesized by using hydroxyethyl cellulose as raw material | Formaldehyde | 10 | DMF | —O—CH$_2$—O— |
| Example 28 | Thiol-modified cellulose acetate | Synthesized in accordance with description of WO2008/071058 | Divinyl ether | 10 | DMF | —S—(CH$_2$)$_2$—S— |
| Example 29 | Amine-modified cellulose acetate | Synthesized in accordance with description of Japanese Unexamined Patent Application Publication No. 2009-167307 | Ethyl chloroformate | 10 | DMF | —NHC(=O)NH— |
| Example 30 | Amine-modified cellulose acetate | Synthesized in accordance with description of Japanese Unexamined Patent Application Publication No. 2009-167307 | 1,3-Propane-disulfonic acid | 10 | DMF | —SO$_3^-$N$^+$H$_3$— |
| Example 31 | Amine-modified cellulose acetate | Synthesized in accordance with description of Japanese Unexamined Patent Application Publication No. 2009-167307 | Methylene-diphosphonic acid | 10 | DMF | —PO$_3$H$^-$N$^+$H$_3$— |
| Com. Ex. 1 | R = H, COCH$_3$ | Cellulose acetate CA-398-3 (available from Eastman Chemical Company) | None | — | DMF | — |
| Com. Ex. 2 | R = H, COCH$_3$ | Cellulose acetate CA-435-75S (available from Eastman Chemical Company) | None | — | DMF | — |
| Com. Ex. 3 | R = H, COCH$_3$ | Cellulose acetate CA-398-3 (available from Eastman Chemical Company) | Diphenyl-methane diisocyanate | 16.5 | DMF | —NH(C=O)O— |
| Com. Ex. 4 | R = H, COCH$_3$ | Cellulose acetate CA-435-75S (available from Eastman Chemical Company) | Diphenyl-methane diisocyanate | 16.5 | DMF | —NH(C=O)O— |
| Com. Ex. 5 | R = H, COCH$_3$ | Cellulose acetate CA-398-3 (available from Eastman Chemical Company) | 3-Isocyanato-propyl-triethoxysilane | 25.8 | DMF | —NH(C=O)O— |
| Com. Ex. 6 | R = H, COCH$_3$ | Cellulose acetate CA-435-75S (available from Eastman Chemical Company) | 3-Isocyanato-propyl-triethoxysilane | 25.8 | DMF | —NH(C=O)O— |
| Com. Ex. 7 | R = H, COCH$_3$ | Cellulose acetate L-70 (available from Daicel Corporation) | Al(acac)$_3$ | 3 | DMF | —O—Al—O— |
| Com. Ex. 8 | R = H, COCH$_3$ | Cellulose acetate L-70 (available from Daicel Corporation) | Ethyl chloroformate | 10 | DMF | —OC(=O)O— |
| Com. Ex. 9 | Hydroxyethyl-modified cellulose acetate | Synthesized by using hydroxyethyl cellulose as raw material | Formaldehyde | 10 | DMF | —O—CH$_2$—O— |
| Com. Ex. 10 | R = H, COCH$_3$ | Cellulose acetate L-70 (available from Daicel Corporation) | Al(acac)$_3$ | 3 | DMF | —O—Al—O— |

TABLE 1-continued

| | Cellulose resin | | Crosslinking agent | | | |
|---|---|---|---|---|---|---|
| | Cellulose derivatives | Trade name/Synthesis method | Compound | Amount added relative to 100 parts by mass of cellulose resin (parts by mass) | Main solvent | Linking structure in crosslinked structure |
| Com. Ex. 11 | R = H, COCH$_3$ | Cellulose acetate L-70 (available from Daicel Corporation) | Ethyl chloroformate | 10 | DMF | —OC(=O)O— |
| Com. Ex. 12 | Hydroxyethyl-modified cellulose acetate | Synthesized by using hydroxyethyl cellulose as raw material | Formaldehyde | 10 | DMF | —O—CH$_2$—O— |

Com. Ex.: Comparative Example

[Test Example 1] Measurement of Content of Organic Solvent in Gas Separation Layer Each of the gas separation membranes prepared by the methods described in Examples and Comparative Examples was cut out to have a size of 1 cm×1 cm square. The membrane was immersed in 30 mL of a solvent (extraction solvent) for 24 hours, the solvent being different from a solvent to be detected (a solvent that was used for forming the dope solution and that was to be detected) and being capable of extracting the solvent to be detected, to extract the solvent to be detected. This extracted liquid was used as a sample for measuring the content of the organic solvent to be detected. The content (ppm, on a mass basis) of the organic solvent that was to be detected and that was present in the gas separation layer was measured by headspace gas chromatography (GC) using the sample. The measurement conditions were as follows.

Here, in Examples and Comparative Examples, methyl ethyl ketone, N,N-dimethylformamide, n-butanol, N-methylpyrrolidone, N-ethylpyrrolidone, γ-butyrolactone, dimethyl sulfoxide, N,N-dimethylacetamide, dichloromethane, dioxane, 1,3-dioxolane, methanol, and isooctane were used as described above. In the cases where methyl ethyl ketone, n-butanol, dioxane, 1,3-dioxolane, methanol, and isooctane were to be detected, dichloromethane was used as the extraction solvent. In the cases where N,N-dimethylformamide, N-methylpyrrolidone, N-ethylpyrrolidone, γ-butyrolactone, and dimethyl sulfoxide were to be detected, tetrahydrofuran was used as the extraction solvent.

Measurement Conditions
  Vial keep-warm temperature: 80° C.
  Vial keep-warm time: 30 min.
  Amount of injection: 0.8 mL
  Column: PEG-1500 20% on Shimalite (2.6 mm×3 m)
  Column temperature: 80° C.
  Injection port temperature: 150° C.
  Detection temperature: 150° C.
  Column flow rate: N$_2$ 50 mL/min.
  Detector: FID The organic solvent detected in this measurement was only the organic solvent described as "main solvent" in Table 1. The content (ppm) of the organic solvent in the gas separation layer was calculated on a basis of the mass determined by subtracting the mass of the nonwoven fabric (the mass of the nonwoven fabric used as a raw material and having a size of 1 cm×1 cm square) from the mass of the measurement sample. Regarding each of the asymmetric membranes (gas separation membranes), the whole asymmetric structure (excluding the nonwoven fabric) is formed of the same material. Thus, the content of the organic solvent measured above (the content of the organic solvent in a portion excluding the nonwoven fabric) is equal to the content of the organic solvent of the gas separation layer (dense layer).

[Test Example 2] Measurement of Insolubilization Ratio

Each of the gas separation membranes prepared by the methods described in Examples and Comparative Examples and having an area of 10 cm$^2$ was immersed in 500 g of chloroform for 12 hours. Subsequently, the membrane was removed from the chloroform and dried at 100° C. under vacuum. An insolubilization ratio was calculated by using the formula below on the basis of the mass of the membrane before immersion in chloroform and the mass of the membrane after immersion and drying. The insolubilization ratio was defined as a content (% by mass) of an insoluble component in the crosslinked cellulose resin. In the formula below, the "mass of membrane after immersion" is a value calculated by subtracting the mass of the nonwoven fabric (mass of the nonwoven fabric used as the raw material and having an area of 10 cm$^2$) from the mass of the gas separation membrane after immersion in chloroform, the gas separation membrane having an area of 10 cm$^2$, and the "mass of membrane before immersion" is a value calculated by subtracting the mass of the nonwoven fabric (mass of the nonwoven fabric used as the raw material and having an area of 10 cm$^2$) from the mass of the gas separation membrane before immersion in chloroform, the gas separation membrane having an area of 10 cm$^2$.

Insolubilization ratio (% by mass)=100×[mass of membrane after immersion/mass of membrane before immersion]

[Test Example 3] Evaluation of Membrane Formability

In accordance with the method described in each of Examples and Comparative Examples, 50 gas separation membrane samples were prepared. The permeance of hydrogen of each of the 50 samples was measured. Samples having a hydrogen permeance of more than 1×10$^6$ mL/m$^2$·24 h·atm were determined as membranes having pinholes (sample errors), and a sample error rate was determined by using a formula given below. The membrane formability was evaluated on the basis of the sample error rate in accordance with evaluation criteria, which are described below.

Sample error rate (%)=100×[the number of sample errors/50]

Evaluation Criteria for Membrane Formability
AA: Error rate was 2% or less.
A: Error rate was more than 2% and 5% or less.
B: Error rate was more than 5%.

[Test Example 4] Evaluation of Gas Separation Performance

The gas separation performance was evaluated as described below by using each of the gas separation membranes prepared in Examples and Comparative Examples.

The gas separation membranes with nonwoven fabrics were each cut in a circular shape having a diameter of 47 mm to prepare permeation test samples. Mixed gas of carbon dioxide ($CO_2$) and methane ($CH_4$) ($CO_2$:$CH_4$=30:70 (volume ratio)) was adjusted so as to have a total pressure on the gas supply side of 4 MPa (partial pressure of $CO_2$:1.2 MPa), a flow rate of 500 mL/min, and a temperature of 45° C. and supplied from the skin layer side by using a gas permeation analysis system available from GTR Tec Corporation. Gas that had permeated through each of the gas separation membranes was analyzed by gas chromatography. The gas permeabilities of the membranes were compared to each other by calculating a gas permeation rate as gas permeance. The gas permeance (gas permeation rate) was represented in units of GPU [1 GPU=1×10$^{-6}$ cm$^3$ (STP)/cm$^2$·sec·cmHg]. The gas separation selectivity was calculated as a ratio ($R_{CO2}$/$R_{CH4}$) of the permeation rate $R_{CO2}$ of $CO_2$ to the permeation rate $R_{CH4}$ of $CH_4$ of the membrane. In the evaluation of the gas separation performance, the measurement was conducted after gas separation was started and the gas separation performance was then stabilized.

[Test Example 5] Evaluation of Folding Endurance

The gas separation membrane of the present invention is often used in the form of a package which is filled with a membrane and is referred to as a module or an element. When a gas separation membrane is used in the form of a module, the module is filled with the gas separation membrane at a high density in order to ensure a large membrane surface area. In the case of a flat membrane, the membrane fills the module in a state of being folded in a spiral manner.

In view of this, for the gas separation membranes prepared in Examples and Comparative Examples, an operation of folding at 90 degrees and unfolding to the original state was performed 50 times. Subsequently, the gas permeance was again measured as in Test Example 4. The folding endurance was evaluated on the basis of a change in the permeability of methane gas in accordance with evaluation criteria, which are described below.

Evaluation Criteria for Folding Endurance
A: Permeance of methane gas did not change before and after the folding.
B: Permeance of methane gas increased slightly after the folding.
C: Permeance of methane gas increased significantly after the folding.

[Test Example 6] Wet Heat Aging Test

The gas separation membranes prepared in Examples and Comparative Examples were stored under conditions of 80° C. and a relative humidity of 90% (low-temperature constant temperature and humidity chamber, available from Isuzu Seisakusho Co., Ltd., quartz crystal) for 24 hours. The gas separation selectivity was then determined as in Test Example 4. The results are shown in tables below.

[Test Example 7] Toluene Exposure Test

An empty 100 mL beaker was allowed to stand in a glass container which contained a toluene solvent and to which it was possible to attach a lid to cover the toluene solvent. Strips of the gas separation membranes prepared in Examples and Comparative Examples were placed in the beaker, and the glass container was sealed by being covered with the glass lid. Subsequently, the gas separation membranes were stored at 30° C. for two hours. The gas separation selectivity was then determined as in Test Example 4 by using these strips. This toluene exposure enables the evaluation of resistance to plasticization of gas separation membranes due to impurity components, such as benzene, toluene, and xylene, which can be present in natural gas.

[Test Example 8] Time Necessary for Stabilization of Gas Separation Performance

Mixed gas of carbon dioxide ($CO_2$) and methane ($CH_4$) ($CO_2$:$CH_4$=30:70 (volume ratio)), the mixed gas further containing 100 ppm of toluene, was adjusted so as to have a total pressure on the gas supply side of 4 MPa (partial pressure of $CO_2$:1.2 MPa), a flow rate of 500 mL/min, and a temperature of 45° C. and supplied from the skin layer side of each of the gas separation membranes prepared in Examples and Comparative Examples by using the gas permeation analysis system. Gas that had permeated through each of the gas separation membranes was analyzed by gas chromatography. Time was plotted on the horizontal axis, and gas permeance was plotted on the vertical axis to evaluate the time during which the value of permeability (the total permeance of carbon dioxide and methane) fell within ±10% relative to the average of the permeability (the total permeance of carbon dioxide and methane) from the start of the measurement.

Evaluation Criteria for Time Necessary for Stabilization of Gas Separation Performance (Stabilization Time)
A: Stabilization time was less than 2 hours.
B: Stabilization time was 4 hours or more and less than 8 hours.
C: Stabilization time was 8 hours or more and less than 16 hours.
D: Stabilization time was 16 hours or more.

Table 2 shows the results of Test Examples described above.

TABLE 2

| | Content of organic solvent [ppm] | Insolubilization ratio [mass %] | Membrane formability [Sample error rate (%)] | Folding endurance | Stabilization time | $CO_2$ permeance [GPU] | $R_{CO2}/R_{CH4}$ Untreated | After wet heat test | After toluene exposure |
|---|---|---|---|---|---|---|---|---|---|
| Example 1 | 50 | 80 | AA | A | A | 85 | 42 | 40 | 39 |
| Example 2 | 80 | 95 | AA | A | A | 86 | 40 | 38 | 36 |
| Example 3 | 320 | 95 | AA | A | A | 88 | 40 | 38 | 36 |
| Example 4 | 310 | 98 | AA | A | A | 90 | 37 | 35 | 33 |
| Example 5 | 50 | 65 | AA | A | A | 84 | 45 | 43 | 40 |
| Example 6 | 30 | 81 | AA | A | B | 81 | 38 | 36 | 36 |
| Example 7 | 60 | 64 | AA | A | A | 91 | 37 | 36 | 35 |
| Example 8 | 80 | 70 | A | B | A | 62 | 37 | 31 | 28 |
| Example 9 | 105 | 76 | A | B | A | 95 | 30 | 25 | 21 |
| Example 10 | 52 | 52 | AA | A | A | 85 | 35 | 32 | 28 |
| Example 11 | 84 | 65 | AA | A | A | 64 | 36 | 32 | 32 |
| Example 12 | 70 | 55 | AA | B | A | 91 | 31 | 27 | 25 |
| Example 13 | 635 | 60 | AA | A | A | 86 | 35 | 34 | 34 |
| Example 14 | 40 | 52 | A | B | B | 93 | 29 | 26 | 22 |
| Example 15 | 45 | 63 | AA | A | A | 85 | 38 | 36 | 34 |
| Example 16 | 50 | 58 | AA | A | A | 88 | 35 | 30 | 28 |
| Example 17 | 95 | 68 | AA | A | A | 85 | 42 | 40 | 39 |
| Example 18 | 150 | 80 | AA | A | A | 88 | 40 | 39 | 39 |
| Example 19 | 45 | 65 | AA | A | A | 81 | 37 | 33 | 33 |
| Example 20 | 1020 | 75 | AA | A | A | 82 | 37 | 33 | 32 |
| Example 21 | 74 | 74 | AA | A | A | 80 | 37 | 35 | 34 |
| Example 22 | 20 | 70 | AA | A | B | 91 | 35 | 33 | 31 |
| Example 23 | 25 | 72 | AA | A | B | 89 | 31 | 35 | 32 |
| Example 24 | 30 | 64 | AA | A | B | 64 | 32 | 35 | 30 |
| Example 25 | 30 | 80 | A | A | B | 65 | 42 | 38 | 35 |
| Example 26 | 123 | 88 | A | A | A | 51 | 36 | 33 | 31 |
| Example 27 | 300 | 70 | A | A | A | 75 | 33 | 32 | 31 |
| Example 28 | 200 | 75 | A | A | A | 65 | 32 | 30 | 28 |
| Example 29 | 350 | 73 | A | A | A | 52 | 35 | 29 | 29 |
| Example 30 | 500 | 68 | A | A | A | 50 | 34 | 29 | 30 |
| Example 31 | 200 | 67 | A | A | A | 48 | 36 | 28 | 30 |
| Com. Ex. 1 | 150 | 0 | B | C | A | 11 | 19 | 15 | 11 |
| Com. Ex. 2 | 180 | 0 | B | C | A | 38 | 20 | 13 | 6 |
| Com. Ex. 3 | 630 | 32 | B | C | A | 39 | 19 | 13 | 12 |
| Com. Ex. 4 | 980 | 39 | B | C | A | 28 | 20 | 9 | 6 |
| Com. Ex. 5 | 850 | 53 | A | C | A | 22 | 18 | 13 | 10 |
| Com. Ex. 6 | 1050 | 51 | A | C | A | 34 | 19 | 14 | 10 |
| Com. Ex. 7 | 9200 | 75 | A | A | C | 135 | 24 | 13 | 15 |
| Com. Ex. 8 | 7050 | 78 | A | A | C | 142 | 22 | 12 | 16 |
| Com. Ex. 9 | 10500 | 65 | A | A | C | 175 | 23 | 14 | 15 |
| Com. Ex. 10 | 7 | 80 | AA | A | D | 35 | 38 | 37 | 35 |
| Com. Ex. 11 | 8 | 78 | A | A | D | 31 | 37 | 36 | 34 |
| Com. Ex. 12 | 7 | 68 | A | A | D | 17 | 33 | 32 | 30 |

Com. Ex.: Comparative Example

As shown in Table 2, it was found that the gas separation membranes formed by using cellulose resins that did not have a crosslinked structure had poor gas permeance and poor gas separation selectivity, and that the gas separation selectivity of each of the gas separation membranes was decreased under the high-temperature high-humidity conditions and by toluene exposure. In addition, these gas separation membranes had poor membrane formability (low yield) and poor folding endurance (Comparative Examples 1 and 2).

Even in the cases where the gas separation layer was formed by using a crosslinked cellulose resin, crosslinked structures that did not satisfy the specification of the present invention also resulted in poor gas permeance and poor gas separation selectivity. In addition, the gas separation selectivity was decreased under the high-temperature high-humidity conditions and by toluene exposure. Furthermore, the membrane formability and the folding endurance the gas separation membranes were also poor (Comparative Examples 3 to 6).

Even in the cases where the gas separation layer was formed by using a crosslinked cellulose resin of the present invention, an amount of solvent remaining in the gas separation layer larger than that specified in the present invention resulted in a long stabilization time and significantly poor gas separation selectivity (Comparative Examples 7 to 9).

When the content of the organic solvent in the gas separation layer was lower than that specified in the present invention, the stabilization time significantly increased (Comparative Examples 10 to 12).

In contrast, the gas separation membranes of Examples 1 to 31 each had good gas permeance and good gas separation selectivity. Furthermore, these gas separation membranes exhibited high gas permeance and high gas separation selectivity even under the high-temperature high-humidity conditions and even after toluene exposure. In addition, these gas separation membranes had good membrane formability and good folding endurance.

[Examples 32 to 34] Preparation of Asymmetric Membranes (Addition of Cellulose Nanofibers)

Cellulose nanofibers were prepared by the method described in a literature Biomacromolecules, 2006, 7(6), pp. 1687-1691. The prepared cellulose nanofibers had a maximum fiber diameter of 50 nm, an average fiber diameter of 45 nm, and an average fiber length of 150 μm (average fiber length/average fiber diameter=3333).

Asymmetric membranes (gas separation membranes) of Examples 32 to 34 were prepared as in Example 1 except that the cellulose nanofibers were further added to dope solutions in amounts described in Table 3 below and the raw materials described in Table 3 were used.

The characteristics and the gas separation performance were evaluated as in Test Examples 1 to 7 described above by using the gas separation membranes of Examples 32 to 34.

Table 3 shows the results.

[Example 35] Preparation of Composite Membrane

Preparation of PAN Porous Membrane with Smooth Layer
Preparation of Radiation-Curable Polymer Having Dialkylsiloxane Group
Both-terminal methacrylate-modified polydimethylsiloxane X-22-164E (available from Shin-Etsu Chemical Co., Ltd.)
Irgacure 184 (available from BASF)

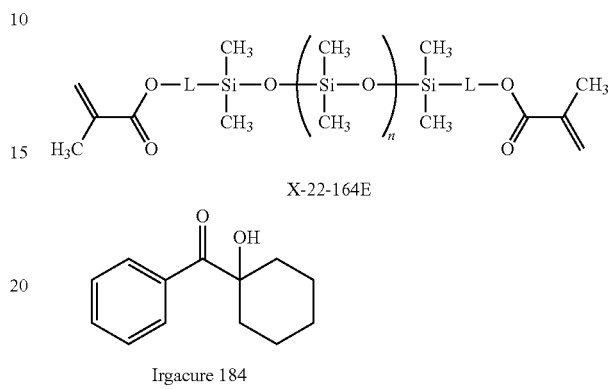

X-22-164E

Irgacure 184

L: organic group

TABLE 3

| | Cellulose resin | | Crosslinking agent | | | | |
|---|---|---|---|---|---|---|---|
| | Cellulose derivatives | Trade name | Compound | Amount added relative to 100 parts by mass of cellulose resin (parts by mass) | Main solvent | Content of cellulose nonofibers in dope solution [mass %] | Linking structure in crosslinked structure |
| Example 32 | R = H, COCH₃ | Cellulose acetate L-70 (available from Daicel Corporation) | Al(acac)₃ | 3 | DMF | 1.0 | —O—Al—O— |
| Example 33 | R = H, COCH₃ | Cellulose acetate L-70 (available from Daicel Corporation) | Al(acac)₃ | 3 | DMF | 3.0 | —O—Al—O— |
| Example 34 | R = H, COCH₃ | Cellulose acetate LT-55 (available from Daicel Corporation) | Al(OiPr)₃ | 3 | DMF | 5.0 | —O—Al—O— |

| | Content of organic solvent [ppm] | Insolubilization ratio [mass %] | Membrane formability [Sample error rate (%)] | Folding endurance | $CO_2$ permeance [GPU] | $R_{CO2}/R_{CH4}$ Untreated | After wet heat test | After toluene exposure |
|---|---|---|---|---|---|---|---|---|
| Example 32 | 60 | 90 | AA | A | 105 | 43 | 41 | 40 |
| Example 33 | 104 | 94 | A | A | 106 | 41 | 39 | 37 |
| Example 34 | 215 | 92 | A | A | 108 | 40 | 38 | 36 |

As is apparent from the comparison between the results in Table 3 and the results in Table 2, it was found that the addition of the cellulose nanofibers in the gas separation layer enabled the gas permeability to be enhanced while the gas separation selectivity was maintained.

A both-terminal methacrylate-modified polydimethylsiloxane X-22-164E (available from Shin-Etsu Chemical Co., Ltd.) (39 g) was placed in a 150 mL three-necked flask, and 50 g of n-heptane was added to the flask to dissolve the polydimethylsiloxane. The resulting solution was aged at 75° C. for 12 hours to prepare a solution of a radiation-curable polymer having a polysiloxane structure.

Preparation of Radiation-Curable Composition

The polymer solution (5 g) was diluted by adding 95 g of n-heptane. Irgacure 184 (available from BASF) (0.01 g) functioning as a photopolymerization initiator was added to the resulting solution to prepare a radiation-curable composition.

Application of Radiation-Curable Composition to Porous Support and Formation of Smooth Layer The radiation-curable composition was applied, by spin coating, to a polyacrylonitrile (PAN) porous membrane (membrane having a polyacrylonitrile porous membrane disposed on a nonwoven fabric, thickness of membrane including nonwoven fabric: about 180 μm) functioning as a support. Subsequently, the resulting porous membrane with the radiation-curable composition was irradiated with UV (Light Hammer 10, D bulb, available from Fusion UV Systems, Inc.) under UV treatment conditions of a UV intensity of 24 kW/m and a treatment time of 10 seconds and then dried. As a result, a smooth layer having a thickness of 1 μm and having a dialkylsiloxane group was formed on the porous support.

Preparation of Composite Membrane

In a 30 mL brown vial bottle, 0.20 g of cellulose acetate (trade name: L-70, available from Daicel Corporation, acetylation degree 0.55, where the Willi "acetylation degree" refers to a weight percentage of bonded acetic acid per unit weight), 0.015 g of tris(2,4-pentanedionato)aluminum(III) (0.046 mmol, available from Tokyo Chemical Industry Co., Ltd., Product No.: A0241), and 20.0 g of tetrahydrofuran were charged and mixed, and stirring was conducted for 30 minutes. Next, 3 mL of the resulting mixed liquid was applied, by spin coating, onto the PAN porous membrane having the smooth layer thereon to form a gas separation layer. As a result, a composite gas separation membrane (Example 35) was obtained. The gas separation layer had a thickness of about 150 nm, and the polyacrylonitrile porous membrane had a thickness of about 180 μm that included the thickness of the nonwoven fabric.

A polyacrylonitrile porous membrane having a molecular weight cut-off of 100,000 or less was used as the polyacrylonitrile porous membrane. This porous membrane had a permeability of carbon dioxide at 40° C. and 5 MPa of 25,000 GPU.

[Comparative Example 13] Preparation of Composite Membrane

A composite membrane was prepared as in Example 35 except that, in Example 35, tris(2,4-pentanedionato)aluminum(III) was not added.

Regarding the composite gas separation membranes of Example 35 and Comparative Example 13, the characteristics and the gas separation performance were evaluated as in Test Examples 1 to 7 described above. In the measurement of the content of an organic solvent and the insolubilization ratio, the gas separation layers of the composite gas separation membranes were used as the samples.

Table 4 shows the results.

TABLE 4

| | Cellulose resin | | Crosslinking agent | | | |
|---|---|---|---|---|---|---|
| | Cellulose derivatives | Trade name | Compound | Amount added to 100 parts by mass of cellulose resin (parts by mass) | Main solvent | Linking structure in crosslinked structure |
| Example 35 | R = H, COCH$_3$ | Cellulose acetate L-70 (available from Daicel Corporation) | Al(acac)$_3$ | 3 | THF | —O—Al—O— |
| Example 13 | R = H, COCH$_3$ | Cellulose acetate L-70 (available from Daicel Corporation) | None | — | THF | — |

| | Content of organic solvent [ppm] | Insolubilization ratio [mass %] | Membrane formability [Sample error rate (%)] | Folding endurance | CO$_2$ permeance [GPU] | $R_{CO2}/R_{CH4}$ | | |
|---|---|---|---|---|---|---|---|---|
| | | | | | | Untreated | After wet heat test | After toluene exposure |
| Example 35 | 60 | 92 | AA | A | 135 | 45 | 43 | 41 |
| Com. Ex. 13 | 1100 | 0 | B | B | 32 | 28 | 25 | 23 |

Com. Ex.: Comparative Example

As shown in Table 4, also in the form of a composite membrane, the gas separation membrane of the present invention had good gas permeability and good gas separation selectivity. Furthermore, the gas separation membrane of the present invention exhibited high gas permeance and good gas separation selectivity even under the high-temperature, high-humidity conditions and after toluene exposure. In addition, the gas separation membrane of the present invention had good membrane formability and good folding endurance.

The above results showed that a good gas separation method, a good gas separation module, and a gas separation apparatus including the gas separation module can be provided by using the gas separation membrane of the present invention.

REFERENCE SIGNS LIST

1: gas separation layer
2: porous layer

3: nonwoven fabric layer
4: smooth layer
5: pore
10, 20, 30: composite gas separation membrane
40: asymmetric gas separation membrane
S: dense layer (skin layer, gas separation layer)
P: porous layer (support layer)

What is claimed is:

1. A gas separation membrane comprising:
a gas separation layer containing a crosslinked cellulose resin,
wherein the crosslinked cellulose resin has, in a crosslinked structure, at least one linking structure selected from the group consisting of *—O-M-O—* and *—S-M-S—*, and
the gas separation layer contains 10 to 5,000 ppm of an organic solvent,
where M represents a divalent to tetravalent metal atom which is selected from the group consisting of iron (Fe), beryllium (Be), gallium (Ga), vanadium (V), indium (In), copper (Cu), cobalt (Co), nickel (Ni), zinc (Zn), calcium (Ca), yttrium (Y), scandium (Sc), chromium (Cr), manganese (Mn), molybdenum (Mo), and boron (B); and the symbol * represents a linking site.

2. The gas separation membrane according to claim 1, wherein the crosslinked cellulose resin is a resin obtained by crosslinking a cellulose resin having a repeating unit represented by General formula (A):

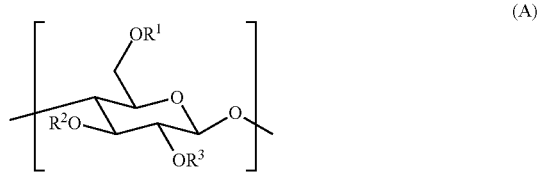

(A)

where $R^1$, $R^2$, and $R^3$ each independently represent a group selected from the group consisting of a hydrogen atom, an alkyl group, and an acyl group.

3. The gas separation membrane according to claim 1, wherein the linking structure represented by *—O-M-O—S* and the linking structure represented by *—S-M-S—* are linking structures formed by coordination of a cellulose resin to a metal atom selected from the group consisting of Zn, B, and Ga through an oxygen atom and a sulfur atom, respectively.

4. The gas separation membrane according to claim 1, wherein the crosslinked cellulose resin contains 40.0% to 99.8% by mass of an insoluble component, and
the insoluble component is insoluble in chloroform.

5. The gas separation membrane according to claim 1, wherein the gas separation layer contains cellulose nanofibers.

6. The gas separation membrane according to claim 5, wherein the cellulose nanofibers have a maximum fiber diameter of 30 to 90 nm and a ratio of an average fiber length to an average fiber diameter of 2,000 to 10,000.

7. The gas separation membrane according to claim 1, wherein the gas separation membrane is an asymmetric membrane.

8. The gas separation membrane according to claim 7, wherein the gas separation membrane has a thickness of 10 to 200 μm.

9. The gas separation membrane according to claim 7, wherein the gas separation membrane is the asymmetric membrane supported by a nonwoven fabric.

10. The gas separation membrane according to claim 1, further comprising:
a functional polymer layer disposed in contact with the gas separation layer,
wherein the functional polymer layer has a group selected from the group consisting of an amino group, a thiol group, a hydrosilyl group, a vinyl group, an acryloyl group, a methacryloyl group, an acid anhydride group, a hydroxy group, and an alkoxy group.

11. The gas separation membrane according to claim 10, wherein the functional polymer layer has a polydimethylsiloxane structure.

12. The gas separation membrane according to claim 1, the gas separation membrane being used to be selectively permeated by carbon dioxide from gas containing carbon dioxide and methane.

13. A gas separation module comprising the gas separation membrane according to claim 1.

14. A gas separation apparatus comprising the gas separation module according to claim 13.

15. A gas separation method comprising supplying gas to the gas separation membrane according to claim 1.

16. The gas separation method according to claim 15, wherein carbon dioxide is selectively permeated through the gas separation membrane to be separated from methane contained in the gas.

17. A method for producing an asymmetric gas separation membrane, the method comprising:
applying, onto a support, a coating solution containing a metal complex and a cellulose resin having an active hydrogen-containing group;
drying a surface of the coating solution on the support; and
bringing the coating solution on the support into contact with a coagulating liquid to form an asymmetric structure by phase inversion,
wherein the metal complex is represented by Formula (B):

(B)

where M represents a divalent to tetravalent metal atom which is selected from the group consisting of iron (Fe), beryllium (Be), gallium (Ga), vanadium (V), indium (In), copper (Cu), cobalt (Co), nickel (Ni), zinc (Zn), calcium (Ca), yttrium (Y), scandium (Sc), chromium (Cr), manganese (Mn), molybdenum (Mo), and boron (B); L represents an alkoxy group, an aryloxy group, an acetylacetonato group, an acyloxy group, a hydroxy group, or a halogen atom; and q represents an integer of 2 to 4.

* * * * *